(12) United States Patent　　(10) Patent No.: US 9,852,349 B2
Tomisawa et al.　　(45) Date of Patent: Dec. 26, 2017

(54) SCANNING SYSTEM, TERMINAL DEVICE AND SCANNING METHOD

(71) Applicant: Renesas Electronics Corporation, Tokyo (JP)

(72) Inventors: Satoru Tomisawa, Tokyo (JP); Koichi Nose, Tokyo (JP); Shunsuke Okumura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/232,948

(22) Filed: Aug. 10, 2016

(65) Prior Publication Data

US 2017/0068869 A1　　Mar. 9, 2017

(30) Foreign Application Priority Data

Sep. 9, 2015　(JP) ................................ 2015-177372

(51) Int. Cl.
*G06K 9/22*　　(2006.01)
*G06K 9/68*　　(2006.01)

(52) U.S. Cl.
CPC ............. *G06K 9/228* (2013.01); *G06K 9/222* (2013.01); *G06K 9/6885* (2013.01); *G06K 2209/01* (2013.01); *G06K 2209/501* (2013.01)

(58) Field of Classification Search
CPC ....... G06K 9/228; G06K 9/222; G06K 9/6885
See application file for complete search history.

(56) References Cited

U.S. PATENT DOCUMENTS

| 5,574,804 | A | * | 11/1996 | Olschafskie | G06K 9/228 235/462.49 |
| 6,081,261 | A | | 6/2000 | Wolff et al. | |
| 2005/0243369 | A1 | * | 11/2005 | Goldstein | G06F 17/242 358/1.18 |
| 2006/0023945 | A1 | * | 2/2006 | King | H04N 1/00244 382/173 |
| 2006/0285172 | A1 | * | 12/2006 | Hull | G06F 17/30247 358/448 |

FOREIGN PATENT DOCUMENTS

JP　　2004-303254 A　　10/2004

* cited by examiner

*Primary Examiner* — David F Dunphy
(74) *Attorney, Agent, or Firm* — Mattingly & Malur, PC

(57) ABSTRACT

A scanner system includes a pen-shaped scanner that scans a character strings that is one part of a sentence described in a paper book and generates and transmits sentence image data on the basis of the scanned character string, a storage unit that stores therein book image data that is higher in image quality than the sentence image data and is obtained by electronically imaging the sentence described in the paper book, and a matching unit that compares the book image data with the sentence image data that the pen-shaped scanner has transmitted and extracts partial image data that has been decide to match the sentence image data from the book image data.

13 Claims, 26 Drawing Sheets

SCANNING SYSTEM, TERMINAL DEVICE AND SCANNING METHOD

CROSS-REFERENCE TO RELATED APPLICATIONS

The disclosure of Japanese Patent Application No. 2015-177372 filed on Sep. 9, 2015 including the specification, drawings and abstract is incorporated herein by reference in its entirety.

BACKGROUND

The present invention relates to a scanning system, a terminal device and a scanning method and, in particular, relates to, for example, a technology of scanning a character string that is one part of a sentence described in a paper book.

Nowadays, smartphones are widely used. Therefore, as a method of saving the contents of the paper book concerned as electronic data, a method of photographing a paper plane of the paper book by a high resolution camera loaded on the smartphone is generally used. However, when attempting to pick up and save only one specific sentence in sentences on the paper plane, also sentences around one specific sentence are photo-combined simultaneously with photographing of one specific sentence in the above-mentioned method that the camera is used when the paper plane is photographed. Therefore, it is requested to perform work (a trimming process) for removing a useless range in a photographed image after the paper plane has been photographed.

There exist such strong needs that one specific sentence is to be saved as electronic data for reasons, for example, that a reader of the book was impressed with one specific sentence in the sentences. As a technology for coping with the above-mentioned needs, there exists a technology disclosed, for example, in Japanese Unexamined Patent Application Publication No. 2004-303254.

In Japanese Unexamined Patent Application Publication No. 2004-303254, there is disclosed the technology of aiming to make data conversion possible between a document and an electronic document by using a simple system. An electronic document operation system disclosed in Japanese Unexamined Patent Application Publication No. 2004-303254 includes a pen device and a base unit. The pen device includes three optical sensors (CCD arrays). The first optical sensor is attached to a linear side face of the pen device along the length of the pen device. The second optical sensor is attached to a nib or one side face of the nib of the pen device. The third optical sensor is attached to a rear end part of the pen device. The first optical sensor is used, for example, in order to scan a large part of one page. The second optical sensor is used, for example, in order to discriminate a local content of the document concerned from others by recognizing a mark that has been printed in advance.

The above-mentioned optical sensors are adapted to execute at least Optical Character Recognition (OCR). An output from each optical sensor is transmitted to the base unit by a transmitter of the pen device as a sensor signal. The base unit communicates with the pen device and receives the sensor signal. The base unit executes a hand-written message recognition algorithm by using an auxiliary processor.

SUMMARY

However, it is desired for the technology disclosed in Japanese Unexamined Patent Application Publication No. 2004-303254 to acquire an image of high image quality in order to execute OCR. Accordingly, it is requested to mount a high resolution optical sensor and a high performance processing system (an MCU (Micro Control Unit, a memory and so forth) onto the pen device. Therefore, there is such a disadvantage that the pen device becomes thicker and more expensive than a pen that is generally used for writing characters.

It is effective to use a low-cost optical sensor for attaining downsizing and cost saving of the pen device. However, in this case, the quality of the image that is acquired by the low-cost optical sensor is reduced. Accordingly, there are such disadvantages that a recognition rate of OCR is lowered and it becomes difficult to attain desirable service quality.

Other subject matters and novel features of the present invention will become apparent from the following description of the present specification and the appended drawings.

According to one embodiment of the present invention, there is provided a scanning system that extracts partial image data that has been decided to match sentence image data from book image data that is higher in image quality than the sentence image data obtained by scanning a character string that is one part of a sentence described in a paper book and is obtained by electronically imaging the sentence described in the paper book.

In the scanning system according to one embodiment of the present invention, it is possible to obtain scanning results of high image quality while suppressing the cost.

DETAILED DESCRIPTION

In the following, preferred embodiments of the present invention will be described with reference to the appended drawings. Concrete numerical values and so forth indicated in the following embodiment are merely illustrative for easy understanding of the embodiments and the present invention is not limited to the above-mentioned numerical values and so forth unless otherwise particularly explained. In addition, in the following description and drawings, the matters and so forth that are obvious to a person skilled in the art are appropriately omitted and simplified for clarification of the description.

First Embodiment

Figure 1:
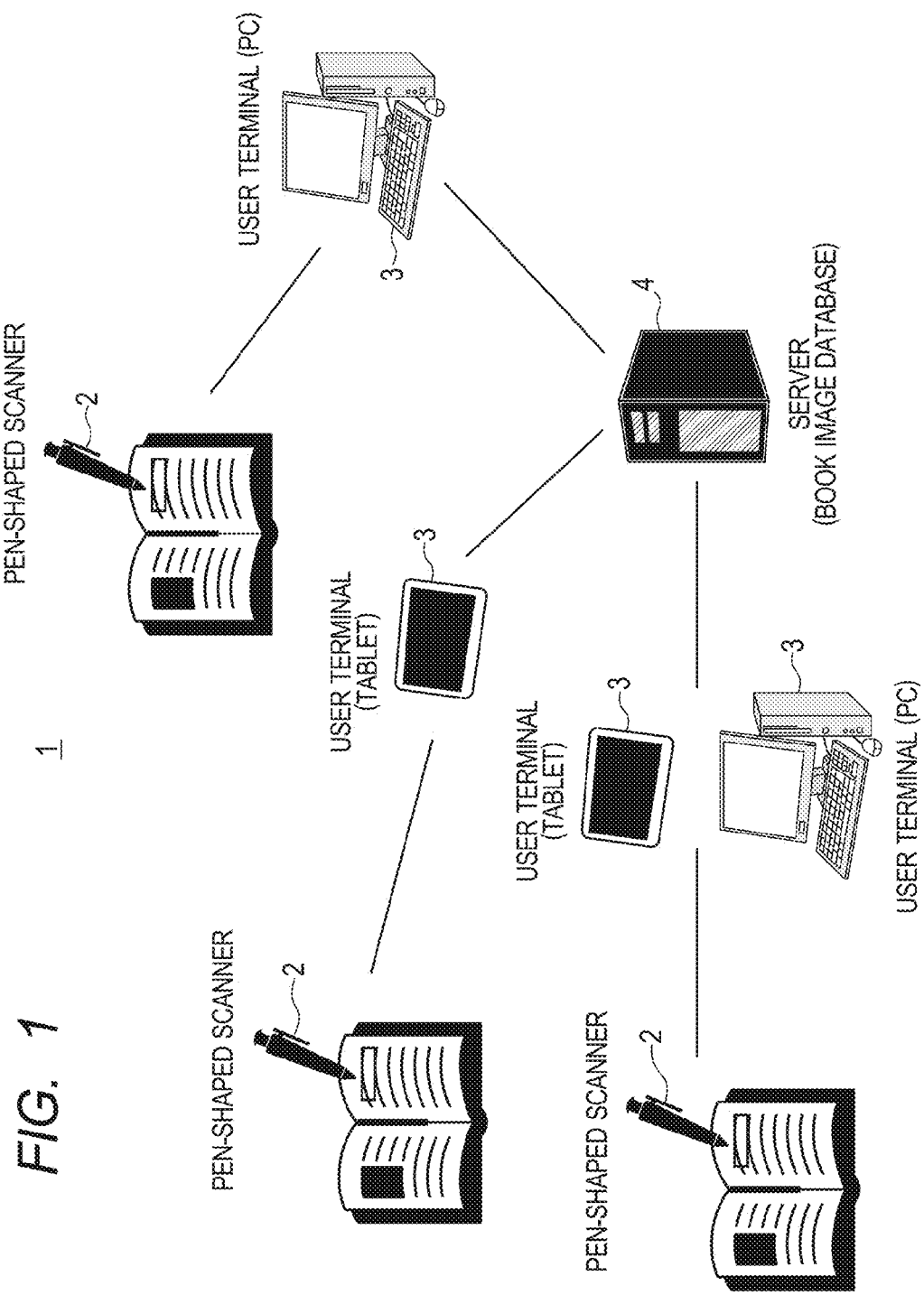
FIG. 1 is a configurational diagram illustrating one example of a scanning system according to a first embodiment.

First, one example of a configuration of a scanning system 1 according to the first embodiment will be described with reference to FIG. 1. As illustrated in FIG. 1, the scanning system 1 includes a plurality of pen-shaped scanners 2, a plurality of user terminals 3, a server 4 and so forth.

Typically, each user utilizes one pen-shaped scanner 2 and one or the plurality of user terminal (s) 3. For example, as illustrated in FIG. 1, there may be present one user who uses one user terminal 3 and there may be present another user who uses two user terminals 3. The server 4 is shared among the plurality of users.

The pen-shaped scanner 2 is a device that scans an optional character string in sentences described in a paper book. The pen-shaped scanner 2 scans the character string in the sentence described in the paper book in accordance with an operation performed by the user and generates image data obtained by imaging the scanned character string. The pen-shaped scanner 2 transmits the generated image data to the user terminal 3 concerned.

The user terminal 3 specifies a range of the character string that has been scanned by the pen-shaped scanner 2 in an electronic book corresponding to the paper book that has been scanned by the pen-shaped scanner 2 on the basis of the image data that has been transmitted from the pen-shaped scanner 2. The user terminal 3 displays and saves a range that has been specified in the electronic book. That is, an image (precisely, an image indicating the same character string as the character string that has been scanned by the pen-shaped scanner 2 in the electronic book) indicating the character string that has been scanned by the pen-shaped scanner 2 is displayed and saved.

The user terminal 3 is a terminal device such as, for example, a PC (Personal Computer), a tablet and so forth. As illustrated in FIG. 1, one user may have either of the PC and the tablet or may have both of the PC and the tablet as the user terminal (s) 3. When the user has both of the PC and the tablet, the user may optionally select and utilize either of the PC and the tablet as the case may be.

The server 4 is an information processing device that a plurality of electronic books that have been obtained by electronically imaging a plurality of paper books are stored in advance. Each of the above-mentioned electronic books includes a plurality of pieces of book image data obtained by electronically imaging the respective sentences on all pages of each paper book. The electronic image data is higher in image quality than the image data that the pen-shaped scanner 2 generates. The user terminal 3 concerned acquires the electronic book concerned from the server 4 and utilizes the acquired electronic book for specification of the range of the character string that has been scanned by using the above-mentioned pen-shaped scanner 2.

Figure 2:
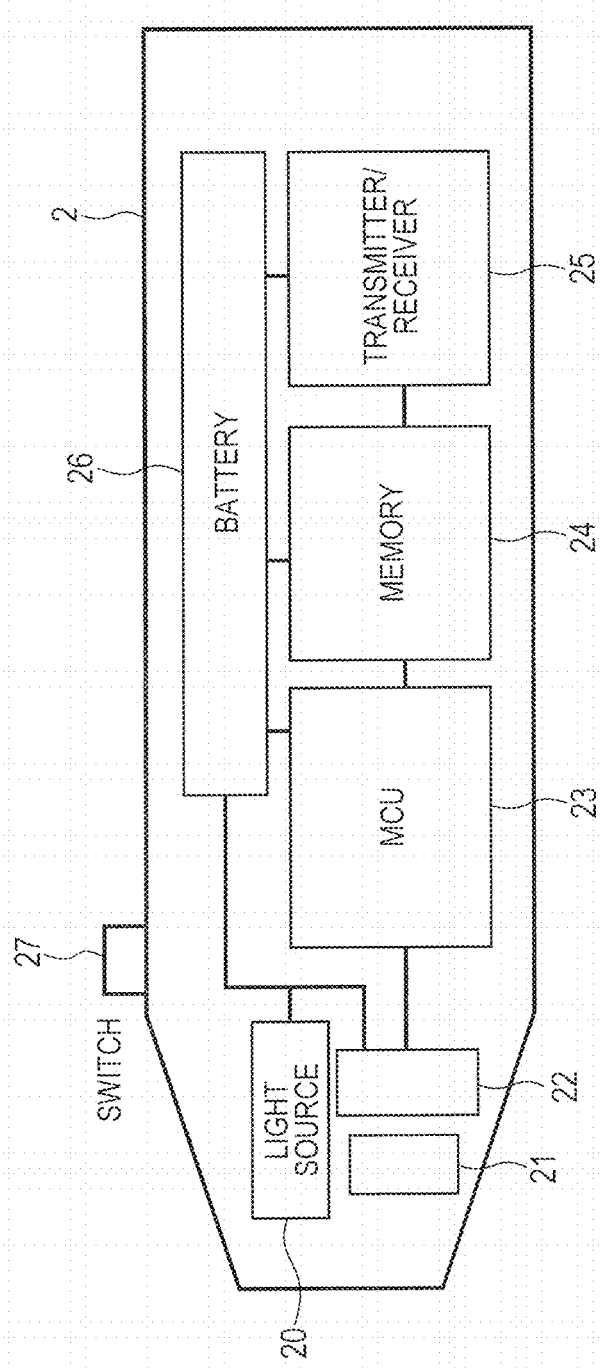
FIG. 2 is a configurational diagram illustrating one example of a pen-shaped scanner according to the first embodiment.

Then, one example of a configuration of the pen-shaped scanner 2 according to the first embodiment will be described with reference to FIG. 2. As illustrated in FIG. 2, the pen-shaped scanner 2 includes a light source 20, a lens 21, an image sensor 22, an MCU 23, a memory 24, a transmitter/receiver 25, a battery 26, a switch 27 and so forth.

The pen-shaped scanner 2 is broadly divided into an image scanning unit (the light source 20, the lens 21, the image sensor 22 and so forth), an image processing unit (the MCU 23, the memory 24 and so forth), an image transmission interface unit (the transmitter/receiver 25 and so forth) and other parts (the battery 26, the switch 27 and so forth).

The light source 20 is a device that emits light and illuminates the paper plane of the paper book concerned with the light. The light source 20 is, for example, an LED (Light Emitting Diode). The lens 21 forms a partial image of the paper plane illuminated by the light source 20 on the image sensor 22. The image sensor 22 photo-electrically converts (scans) the image formed by the lens 21 and generates image data. In other words, the image sensor 22 images one part of the paper plane of the paper book and generates the image data that indicates one part of the paper plane as an image. This image becomes an image indicating a partial character (for example, one character or a part of one character) in the sentence described in the paper book in most cases.

The image sensor 22 is a device that performs scanning at predetermined time intervals and generates the image data indicating the image of scanned contents. A scanning frequency (a frame rate) per unit time is, for example, several—ten fps (Frame Per Second).

Here, as the image sensor 22, a high image quality image sensor (for example, several million pixels that are equivalent to the number of pixels of a smartphone) is not used and a low image quality image sensor is used. The image sensor 22 is, for example, an image sensor (for example, about 500 pixels) used for an optical mouse. Owing to use of the image sensor for the mouse, it is possible to reduce a processing load on the image processing unit and it is also possible to implement downsizing (for example, reduced to less than or equal to a half of an existing scanner) and cost saving (for example, reduced to less than or equal to $1/10$ of the existing scanner) of the pen-shaped scanner 2.

The MCS 23 is a device that controls the operation of the pen-shaped scanner 2. For example, the MCU 23 acquires the image data that the image sensor 22 has generated and stores the acquired image data into the memory 24. The memory 24 is a storage circuit that various kinds of data are stored.

The transmitter/receiver 25 is a circuit that transmits and receives the various kinds of data to and from the user terminal 3 by radio. For example, the transmitter/receiver 25 converts the image data that is stored in the memory 24 in the form of an electrical signal into a radio signal and transmits the radio signal to the user terminal 3.

The battery 26 supplies electric power to the respective constitutional elements 20 to 25 of the pen-shaped scanner 2. That is, the respective constitutional elements 20 to 25 of the pen-shaped scanner 2 operate on the basis of the electric power supplied from the battery 26.

The switch 27 is an input unit through which whether the paper plane of the paper book is being scanned is input by the user. When the paper plane of the paper book is to be scanned, the user performs a scanning operation by depressing the switch 27. On the other hand, when the paper plane of the paper book is not scanned, the user does not depress the switch 27.

More specifically, when the switch 27 is being depressed, the switch 27 outputs a signal indicating that the switch 27 is being depressed to the MCU 23. On the other hand, when the switch 27 is not depressed, the switch 27 outputs a signal indicating that the switch 27 is not depressed to the MCU 23. When the switch 27 is being depressed, the MCU 23 stores the image data that the image sensor 22 has generated into the memory 24 on the basis of the signal output from the switch 27. On the other hand, when the switch 27 is not depressed, the MCU 23 does not store the image data that the image sensor 22 has generated into the memory 24 on The basis of the signal output from the switch 27.

Accordingly, when a desirable character string (for example, one character) in the sentences described in the paper book is to be scanned, the user traces the character string to be scanned using an image scanning part of the pen-shaped scanner 2 while depressing the switch 27. Thereby, a plurality of pieces of the image data that are occasionally generated by the image scanner 22 while tracing one sentence by depressing the switch 27 are stored into the memory 24. Accordingly, by coupling together the plurality of pieces of image data concerned so as to superimpose overlapped parts (the mutually matching parts in contents) of the plurality of images indicated by the plurality of pieces of image data that have been generated while tracing one sentence in this way, the image data obtained by electronically imaging the character string that has been traced using the pen-shaped scanner 2 is generated. In the following, the image data will be also called "scanning result image data" and the image that the image data indicates (the image indicating the character string that has been traced using the pen-shaped scanner 2) will be also called a "scanning result image".

Figure 3:
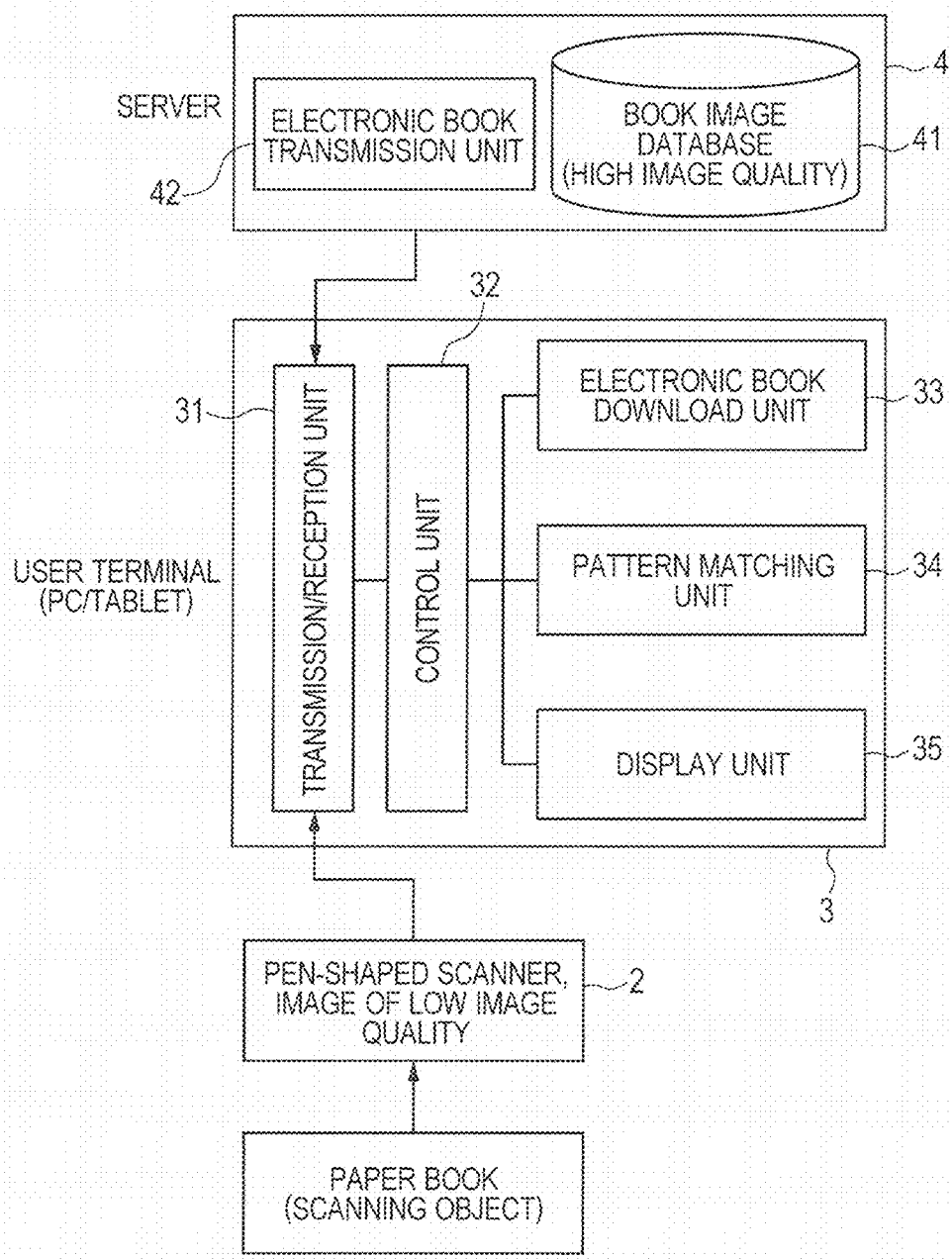
FIG. 3 is a configurational diagram illustrating one example of a user terminal and a server according to the first embodiment.

Then, one example of configurations of the user terminal 3 and the server 4 according to the first embodiment will be described with reference to FIG. 3. As illustrated in FIG. 3, the user terminal 3 includes a transmission/reception unit 31, a control unit 32, an electronic book download unit 83, a pattern matching unit 34, a display unit 35 and so forth.

The transmission/reception unit 31 transmits and receives various kinds of data to and from the pen-shaped scanner 2 via radio communication. For example, the transmission/reception unit 31 receives the image data that has been transmitted from the pen-shaped scanner 2. The transmission/reception unit 31 converts the received image data that is in the form of a radio signal into an electrical signal and outputs the electrical signal to the control unit 32.

In addition, the transmission/reception unit 31 transmits and receives various kinds of data to and from the server 4 via cable communication or radio communication. For example, the transmission/reception unit 31 receives the electronic book concerned that has been transmitted from the server 4. On that occasion, the transmission/reception unit 31 may perform signal conversion on the electronic book in accordance with a telecommunication standard that the transmission/reception unit 31 adopts in cable and radio telecommunication standards. Accordingly, the transmission/reception unit 31 includes a circuit that performs the signal conversion.

The control unit 32 controls the operation of the user terminal 3. The control unit 32 operates the electronic book download unit 33 and the pattern matching unit 34 in accordance with data reception from the pen-shaped scanner 2 and the server 4.

The electronic book download unit 33 downloads a plurality of electronic books from the server 4. More specifically, when the transmission/reception unit 31 has received the image data from the pen-shaped scanner 2, the control unit 32 operates the electronic book download unit 33. The electronic book download unit 33 transmits request data that requests transmission of the electronic books to the server 4 via the transmission/reception unit 31.

The pattern matching unit 34 compares the scanning result image data obtained by coupling together the plurality of pieces of image data that have been received from the pen-shaped scanner 2 with each of the plurality of electronic books that have been downloaded from the server 4 in accordance with the request data transmitted from the electronic book download unit 33. More specifically, when the transmission/reception unit 31 has received the plurality of electronic books from the server 4, the control unit 32 operates the pattern matching unit 34. The pattern matching unit 34 acquires the scanning result image data that indicates the character string in the sentence described in the paper book that the user has scanned using the pen-shaped scanner 2 as the image by coupling together the plurality of pieces of image data concerned so as to superimpose the overlapped parts of the plurality of images that the plurality of pieces of image data received from the pen-shaped scanner 2 indicate. The pattern matching unit 34 compares the scanning result image data with each of the plurality of electronic books received from the server 4. The pattern matching unit 34 specifies a range that matches the scanning result image data from the plurality of electronic books in accordance with the above-mentioned comparison. In other words, the pattern matching unit 34 specifies the range that matches the scanning result image from the images that the plurality of electronic books indicate. The pattern matching unit 34 cuts the specified range out of the electronic book concerned.

Thereby, partial image data that corresponds to the range that has been cut out of the electronic book concerned is generated. That is, the partial image data becomes data on the range indicating the same character string as the character string that the user has scanned using the pen-shaped scanner 2. The control unit 32 operates so as to store the partial image data into a storage unit (not illustrated). The storage unit includes at least one of storages such as, for example, a nonvolatile memory, a hard disk, a flash memory and so forth that the user terminal 3 includes.

The display unit 35 displays an optional image on a display that is coupled to the user terminal 3 or that the user terminal 2 includes. The display is, for example, a liquid crystal display, an organic EL display, a plasma display and so forth. The display unit 35 displays the image that the partial image data generated by the pattern matching unit 34 indicates on the display. That is, this image becomes the image indicating the range that includes the same character string as the character string that the user has scanned using the pen-shaped scanner 2 in images that the plurality of electronic books indicate. In addition, the control unit 32 stores the image data that the pattern matching unit 34 has generated into the storage unit that the user terminal 3 includes.

Here, for example, a CPU (Central Processing Unit) that the user terminal 3 includes executes a program stored in the storage unit that the user terminal 3 includes and thereby the CPU operates as the transmission/reception unit 31, the control unit 32, the electronic book download unit 33, the pattern matching unit 34 and the display unit 35. That is, the program includes a plurality of commands that make the CPU execute processes as the transmission/reception unit 31, the control unit 32, the electronic book download unit 33, the pattern matching unit 34 and the display unit 35.

The server 4 includes a book image database 41, an electronic book transmission unit 42 and so forth.

The book image database 41 is stored in a storage unit (not illustrated) that the server 4 includes. The storage unit includes at least one of storages such as, for example, a memory, a hard disk and so forth. The book image database 41 includes a plurality of electronic books that respectively correspond to the plurality of paper books as service objects. As a saving format of the electronic books, an optional saving format may be utilized. For example, an EPUB (Electronic PUBlication) format may be adopted, taking, for example, data compatibility and so forth into account.

As for a method of preparing the book image database 41, an optional method may be utilized. For example, a company that provides the scanning system 1 may upload the electronic books obtained by electronically imaging paper books that a major publisher will publish into the server 4 after consultation with the major publisher and each service user may upload the electronic book obtained by performing work of electronically imaging the paper book concerned into the server 4.

The electronic book transmission unit 42 receives the request data that requests transmission of the electronic books from the user terminal 3 and then transmits the plurality of electronic books in the book image database 41 to the user terminal 3.

Here, for example, the CPU that the server 4 includes executes the program that is stored in the storage unit that the user terminal 3 includes and thereby the CPU operates as the electronic book transmission unit 42. That is, this program includes a plurality of commands that make the CPU execute the process as the electronic book transmission unit 42. Incidentally, since it is apparent that when transmitting the electronic books, the server 4 performs signal conversion in accordance with the telecommunication standard concerned, detailed description thereof is omitted.

Here, each piece of the plurality of pieces of book image data included in the plurality of electronic books in the book image database 41 is high in image quality in comparison with the image of low image quality that the image data generated by the pen-shaped scanner 2 indicates. Therefore, even when a small-sized and low-cost image sensor by which the image of low image quality is obtained has been utilized as the image sensor 22 of the pen-shaped scanner 2, it is possible for the user to acquire the image data of high image quality that has been cut out of the electronic book concerned as final scanning result image data by performing a scanning operation.

Figure 4:
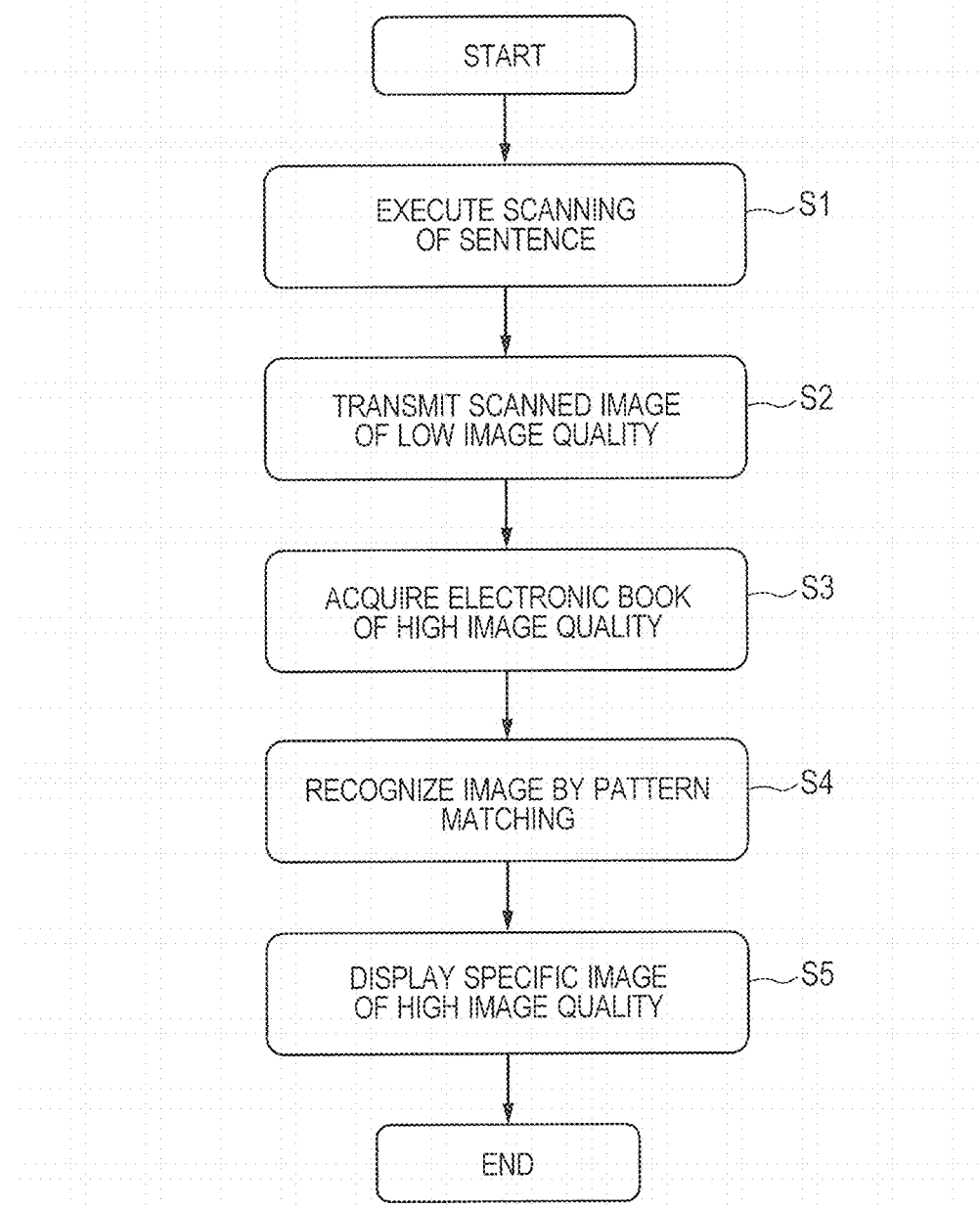
FIG. 4 is a flowchart illustrating one example of an operation of the scanning system according to the first embodiment.

Then, one example of an operation of the scanning system 1 according to the first embodiment will be described with reference to FIG. 4.

The user scans an optional character string (for example, one sentence) from within sentences described in the paper book concerned by using the pen-shaped scanner 2 (S1). That is, The MCU 2 of the pen-shaped scanner 2 stores a plurality of pieces of image data generated by the image sensor 22 into the memory 24 in accordance with the scanning operation that the user performs by depressing the switch 27.

When scanning of the character string has been terminated, the transmitter/receiver 25 of the pen-shaped scanner 2 transmits the plurality of pieces of image data stored in the memory 24 to the user terminal 3 as scanned image data (S2). The scanned image data is lower in image quality than the electronic book that the server 4 saves as described above.

The electronic book download unit 33 of the user terminal 3 downloads the plurality of electronic books of high image quality from the server 4 in accordance with reception of the scanned image data from the pen-shaped scanner 2.

The pattern matching unit 34 of the user terminal 3 performs a pattern matching process on the scanning result image data obtained by coupling together the plurality of pieces of image data received as the scanned image data and on the plurality of electronic books downloaded from the server 4 (S4). An optional method may be adopted as the pattern matching process. For example, a method of utilizing OpenCV (a registered trademark) that is an open source image processing/image analysis library that Intel Inc. develops and opens to the public may be adopted. With respect to this method, also a sample code used to perform the pattern matching process on images is generally opened to the public.

Figure 5:
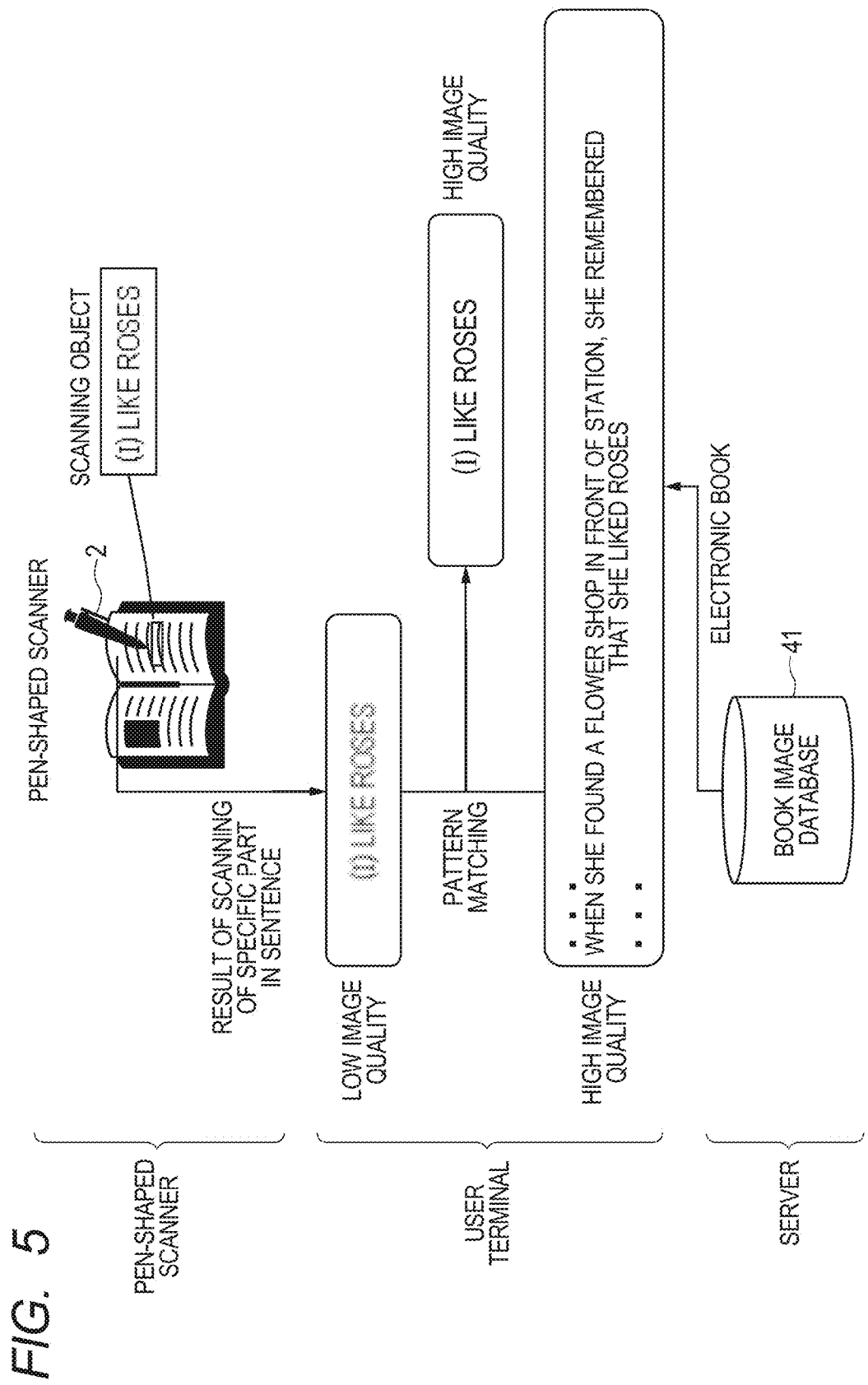
FIG. 5 is a conceptual diagram illustrating one example of a pattern matching process according to the first embodiment.

Here, a conceptual diagram of processes in step S1 to step S4 is illustrated in FIG. 5. For example, as illustrated in FIG. 5, it is supposed that the character string "I like roses" has been scanned from the paper book by using the pen-shaped scanner 2. In this case, the image data that indicates the character string "I like roses" as the image of low image quality is obtained as the scanning result image data obtained by coupling together the plurality of pieces of image data that the pen-shaped scanner 2 has generated. On the other hand, it is supposed that the character string "When she found a flower shop in front of station, she remembered that she liked roses" is included in the sentence included in the image that the electronic book obtained by electronically imaging the paper book indicates in the book image database 41. In this case, an image of the range indicating the character string "I like roses" is extracted from the image that the electronic book of high image quality indicates as the image that matches the image of low image quality that indicates the character string "I like roses" that is based on the scanned image by performing the pattern matching process. The pattern matching unit 34 generates the partial image data that indicates the extracted image.

The display unit 35 of the user terminal 3 displays the image that the partial image data that has been generated by the pattern matching process indicates on the display (S5). In addition, the control unit 32 operates to save the partial image data that has been generated by the pattern matching process into the storage unit. Incidentally, only either of image display and data saving may be also executed.

In addition, in presence of the plurality of pieces of partial image data that have been generated by the pattern matching process (that is, in presence of a plurality of candidates), the display unit 35 may display images that the plurality of pieces of partial image data indicate so as to make the user select the partial image data to be stored. In this case, the control unit 32 operates so as to save the partial image data that the user has selected via an input unit of the user terminal 3 in the storage unit. The input unit is, for example, a mouse, a keyboard, a touch panel and so forth.

Figure 6:
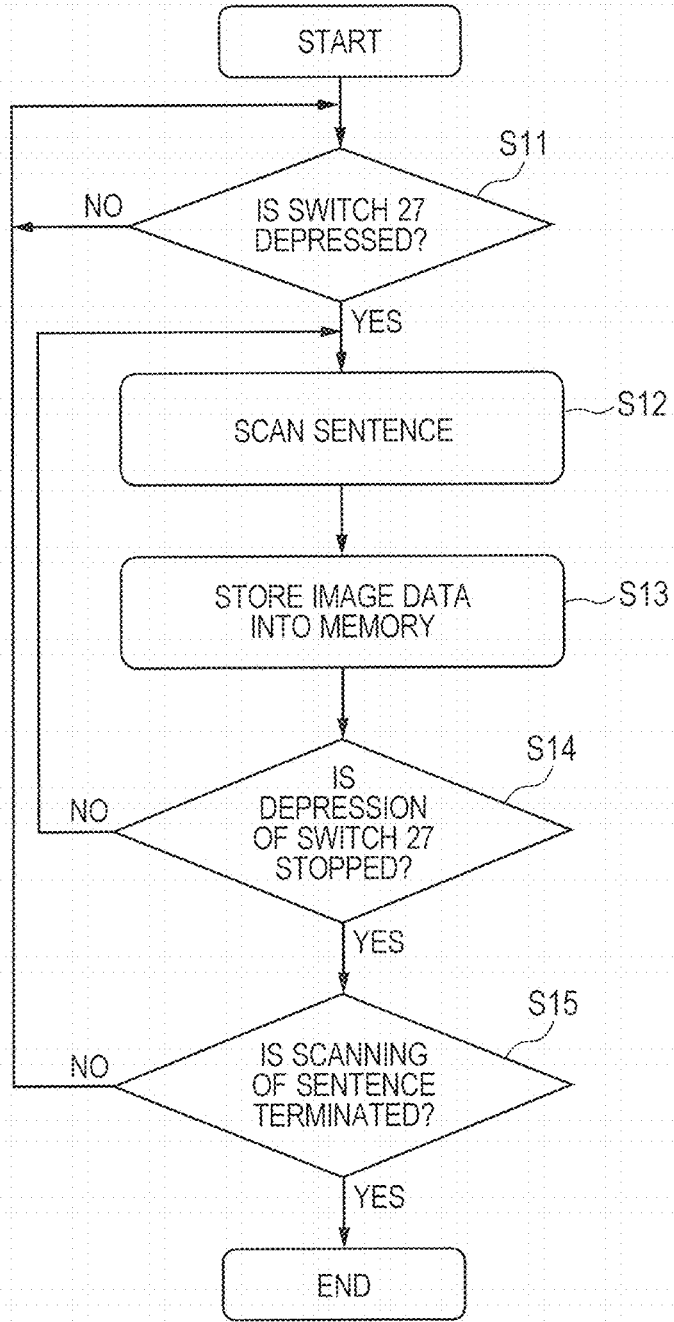
FIG. 6 is a flowchart illustrating one example of an operation of the pen-shaped scanner according to the first embodiment.

Then, one example of detailed operations in step S1 will be described with reference to FIG. 6.

The MCU 23 of the pen-shaped scanner 2 decides whether the user is depressing the switch 27 on the basis of the signal output from the switch 27 (S11). When it has been decided that the user is depressing the switch 27 (S11: Yes), the MUU 23 stores the image data obtained by scanning one part of the sentence described in the paper book into the memory 24 (S12, S13).

The MCU 23 decides whether the user is depressing the switch 27 on the basis of the signal output from the switch 27 (S14). When it has been decided that the user is depressing the switch 27 (S14: No), the MCU 23 continuously stores the image data obtained by scanning one part of the sentence described in the paper book into the memory 24 (S12, S13). That is, the MCU 23 stores the image data that the image sensor 22 generates into the memory 24 occasionally while the switch 27 is being depressed by the user. Thereby, the plurality of pieces of image data that are obtained while the switch 27 is being depressed are stored into the memory 24.

When it has been decided that the user does not depress the switch 27 after the scanning operation has been performed (S14: Yes), the MCU 23 decides whether scanning of the sentence has been terminated (S15). As a decision condition therefor, for example, either of the following conditions (1) and (2) is adopted.

(1) Whether scanning of the sentence has been terminated is decided depending on whether the user is depressing the switch 27.

(2) The pen-shaped scanner 2 further includes a transmission switch (not illustrated) and whether scanning of the sentence has been terminated is decided depending on whether the transmission switch has been depressed.

That is, in case of the decision condition (1), when it has been decided that the user does not depress the switch 27 (S14: Yes), the MCU 23 decides that scanning of the sentence has been terminated (S15: Yes). On the other hand, in case of the decision condition (2), when the transmission switch has been depressed after it has been decided that the user does not depress the switch 27, it is decided that scanning of the sentence has been terminated (S15: Yes).

When it has been decided that scanning of the sentence has been terminated (S15: Yes), the MCU 23 instructs the transmitter/receiver 25 to transmit the image data stored in the memory 24. The transmitter/receiver 25 transmits the plurality of pieces of image data stored in the memory 24 to the user terminal 3 in accordance with the instruction from the MCU 23.

Figure 7:
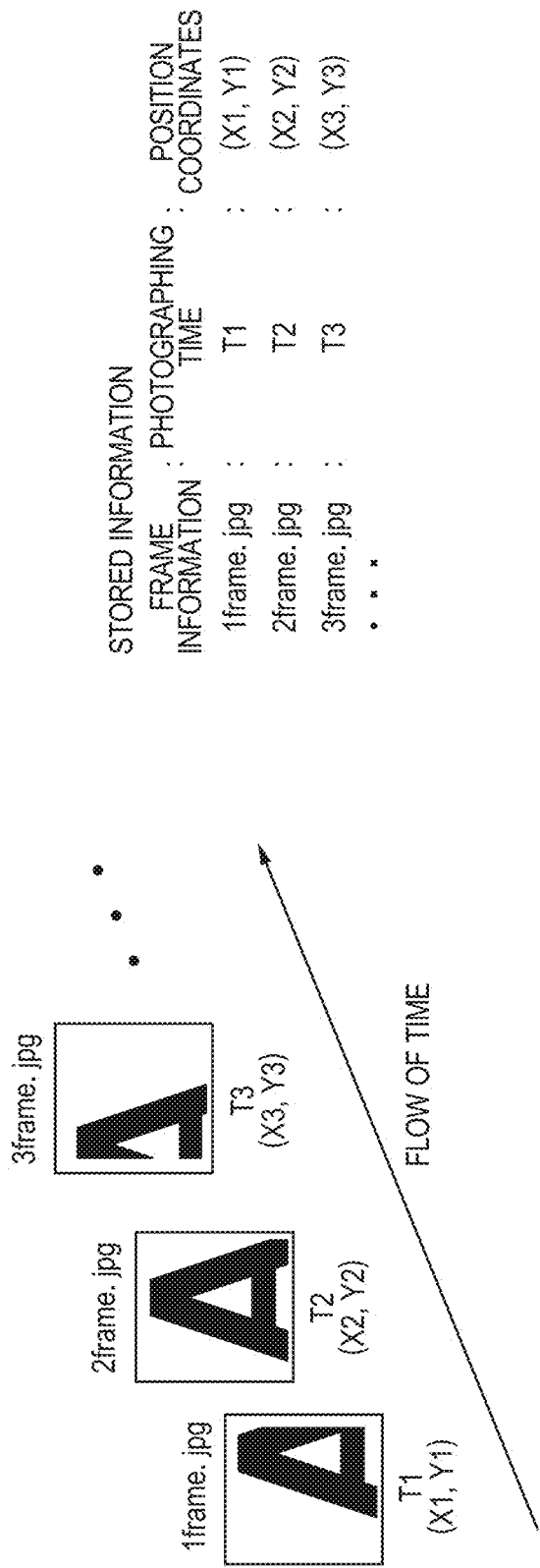
FIG. 7 is a diagram illustrating one example of data that the pen-shaped scanner according to the first embodiment transmits.

Then, one example of character scanning will be described with reference to FIG. 7. FIG. 7 illustrates one example of a case where the alphabet "A" has been scanned from the left side toward the right side.

More specifically, the above-mentioned image data includes frame image data, scan time data, position coordinate data and so forth. The frame image data is image data that indicates the content that the image sensor 22 has scanned as an image. Although the format of the frame image data is "jpg" as illustrated in FIG. 7, other formats may be utilized.

The scan time data indicates a scan time that is a time that the image sensor 22 has generated the frame image data by scanning. For example, it is possible to set (for example, to correct a time lag from the accurate current time) the current time that the pen-shaped scanner 2 counts on the MCU 23 of the pen-shaped scanner 2 from the user terminal 3 via radio communication. That is, the MCU 23 includes a timer (not illustrated) that counts time and it is possible for the MCU 23 to acquire the current time from the timer. The MCU 23 generates the scan time data that indicates the current time that the image data has been acquired from the image sensor 22 as the scan time. Incidentally, the scan time data is data to be recorded for the purpose of appending a tag to the image data.

The position coordinate data is data indicating the position coordinate on the paper plane of the paper book that the image sensor 22 has scanned in generation of the frame image data. A DSP (Digital Signal Processor) that calculates changing directions of characteristic points of temporally adjacent images that have been generated by scanning and calculates an amount of coordinate change of a position that scanning is being performed is built in the general image sensor for mouse. As described above, the image sensor for mouse is utilized as the image sensor 22 of the first embodiment. Therefore, when the frame image data has been acquired from the image sensor 22, it is possible for the MCU 23 to acquire also the data on the amount of position coordinate change that the DSP has generated from the image sensor 22 simultaneously. Accordingly, it is possible for the MCU 23 to calculate a scanning position (the coordinate of the position that scanning has been performed in generation of the frame image data) on the basis of the amount of position coordinate change that the data indicates, with the coordinate of the position that the switch 27 has been depressed and scanning of the character string has been started being defined as a reference and then to generate the position coordinate data that indicates the calculated position coordinate. Position information is utilized as one piece of reference information when coupling together the plurality of pieces of image data acquired.

The MCU 23 transmits the data that includes the frame image data, the scan time data and the position coordinate data to the user terminal 3 as the image data.

Figure 27:
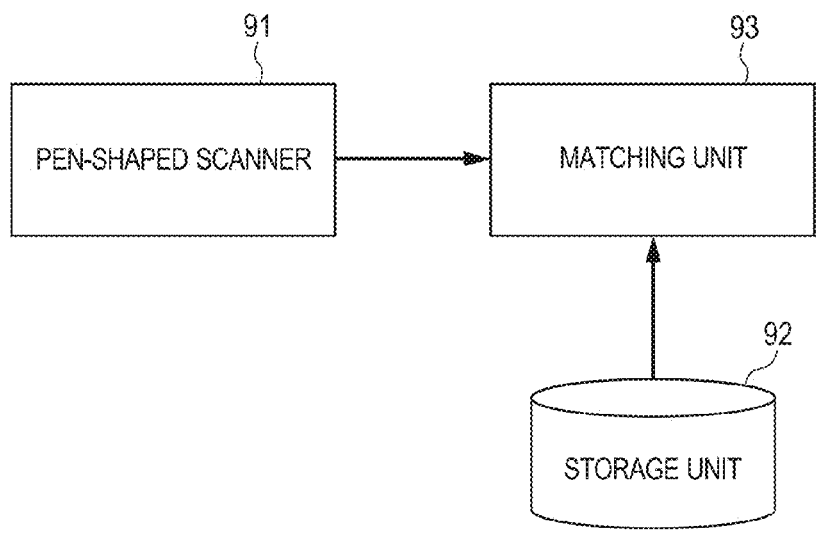
FIG. 27 is a schematic configurational diagram illustrating one example of the scanning system according to the first embodiment.

As described above, the scanning system 1 according to the first embodiment includes a pen-shaped scanner 91 (corresponding to the pen-shaped scanner 2), a storage unit 92 (corresponding to the book image database 41), a matching unit 93 (corresponding to the pattern matching unit 43) and so forth as schematically illustrated in FIG. 27.

The pen-shaped scanner 91 scans the character string that is one part of the sentence described in the paper book and generates and transmits the sentence image data on the basis of the scanned character string. The storage unit 92 stores therein the book image data that is higher in image quality than the sentence image data and is obtained by electronically imaging the sentence described in the paper book. The matching unit 93 compares the book image data stored in the storage unit 92 with the sentence image data that the pen-shaped scanner 2 has transmitted and extracts the partial image data that has been decided to match the sentence image data from the book image data.

Owing to the above-mentioned operation, even when the pen-shaped scanner 2 with the low-cost and low image quality image scanner 22 being mounted has been used, it is possible to obtain the image of high image quality as the final scanning result. That is, according to the first embodiment, it is possible to obtain scanning results of high image quality while suppressing the cost.

Although there is no particular limit on the purpose that the user receives the image of high image quality in the first embodiment, for example, when the scanning object is a sentence, it is possible to perform OCR-based textization and so forth on the sentence.

Second Embodiment

Then, the second embodiment will be described. In the following description of the second embodiment, the same numerals are assigned to the same elements as those in the first embodiment and description thereof is appropriately omitted. Since the configuration of the scanning system 1 and the configuration of the pen-shaped scanner 2 according to the second embodiment are the same as those of the scanning system 1 and the pen-shaped scanner 2 according to the first embodiment, description thereof is omitted.

Figure 8:
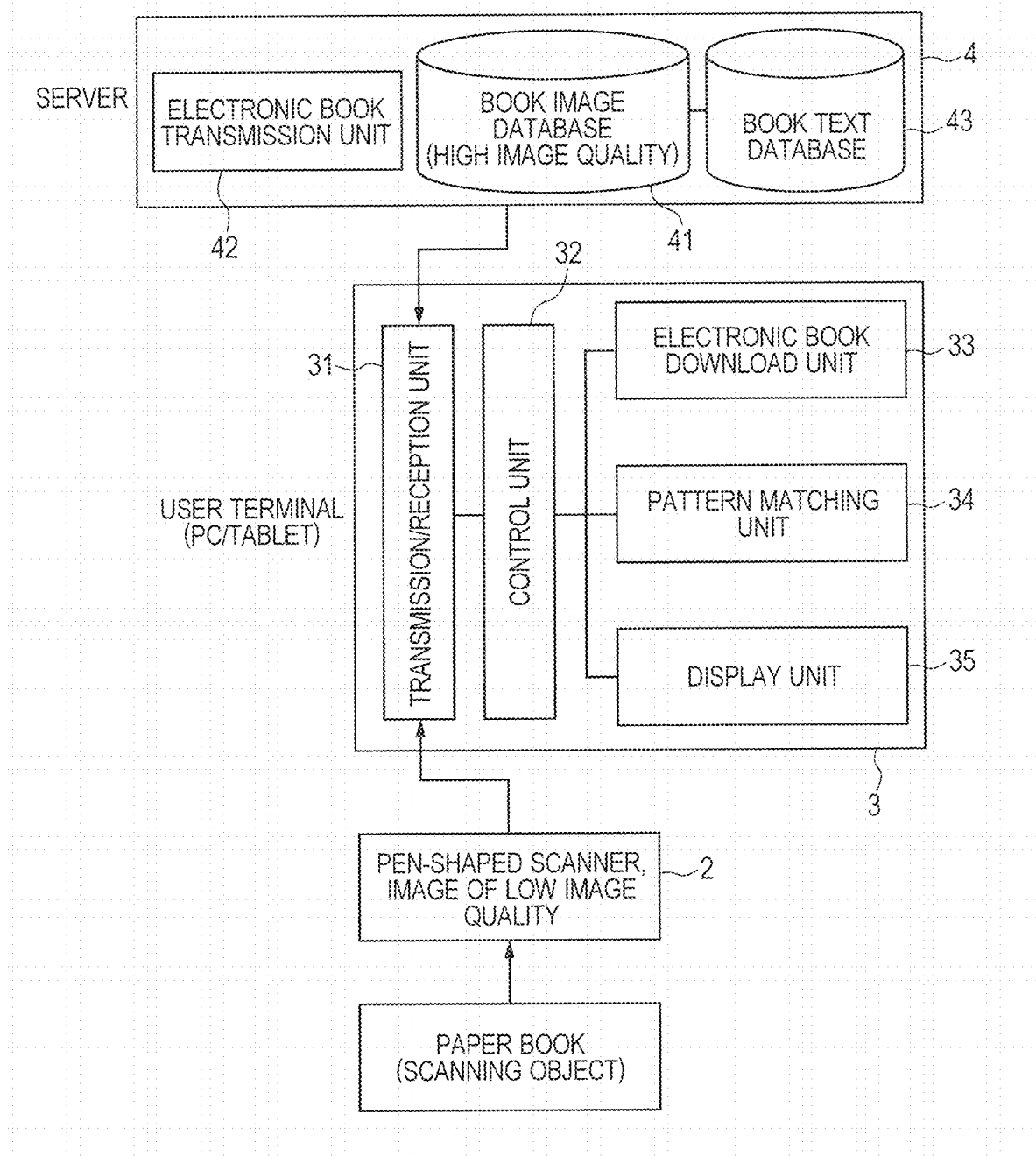
FIG. 8 is a configurational diagram illustrating one example of a user terminal and a server according to a second embodiment.

Then, one example of the configurations of the user terminal 3 and the server 4 according to the second embodiment will be described with reference to FIG. 8. As illustrated in FIG. 8, the server 4 according to the second embodiment is different from the server 4 according to the first embodiment in the point, the server 4 further includes a book text database 43.

The book text database 43 is to be stored into the storage unit that the server 4 includes. The book text database 43 includes a plurality of electronic books corresponding to the plurality of paper books as the service objects. The plurality of electronic books are a plurality of electronic books obtained by electronically textizing the plurality of paper books, differently from the plurality of electronic books to be stored into the book image database 41. The electronic books include a plurality of pieces of book text data that indicate respective sentences on all pages of the paper books in the text format. That is, the plurality of electronic books to be stored into the book image database 41 and the plurality of electronic books to be stored into the book text database 43 respectively correspond to the same plurality of paper books. In the following, the electronic book obtained by electronically imaging the paper book will be also called an "image-type electronic book" and the electronic book obtained by electronically textizing the paper book will be also called a "text-type electronic book".

The electronic book transmission unit 42 according to the second embodiment is different from the electronic book transmission unit 42 according to the first embodiment in the point that when the plurality of image-type electronic books stored in the book image database 41 are to be transmitted, the electronic book transmission unit 42 acquires also the plurality of text-type electronic books stored in the book text database 43 and transmits the text-type electronic books to the user terminal 3 together with the image-type electronic books.

The pattern matching unit 34 according to the second embodiment is different from the pattern matching unit 34 according to the first embodiment in the point that in addition to cutting-out of the range that has been specified in the image-type electronic book by performing the pattern matching process, also cutting-out of a range that corresponds to the range that has been specified in the image-type electronic book is performed in the text-type electronic book that corresponds to the image-type electronic book. Thereby, partial text data that becomes the range that has been cut out of the book text data is generated. Accordingly, the character string that the partial text data indicates becomes the same as the character string that the partial image data that has been cut out of the image-type electronic book indicates as the image.

Here, an optional method may be adopted as a method of specifying mutually corresponding positions between the image-type electronic book and the text-type electronic book. For example, data that the position of each character of the sentence that the image-type electronic book indicates is set in correspondence with the position of each character of the sentence that the text-type electronic book indicates is stored in advance in the storage unit of the server 4. When the image-type electronic book and the text-type electronic book are to be transmitted, the electronic book transmission unit 42 of the server 4 transmits also the above-mentioned data to the user terminal 3. Then, the pattern matching unit 34 of the user terminal 3 may specify the range corresponding to the range that has been specified in the image-type electronic book from the text-type electronic book on the basis of the above-mentioned data that has been transmitted from the server 4.

The display unit 35 according to the second embodiment is different from the display unit 35 according to the first embodiment in the point that the display unit 35 displays also an image of the text that the partial text data generated by the pattern matching unit 34 indicates on the display in addition to the image that the partial image data generated by the pattern matching unit 34 indicates.

The control unit 32 according to the second embodiment is different from the control unit 32 according to the first embodiment in the point that the control unit 32 operates to store also the partial text data generated by the pattern matching unit 34 into the memory unit in addition to the image that the partial image data generated by the pattern matching unit 34 indicates.

Figure 9:
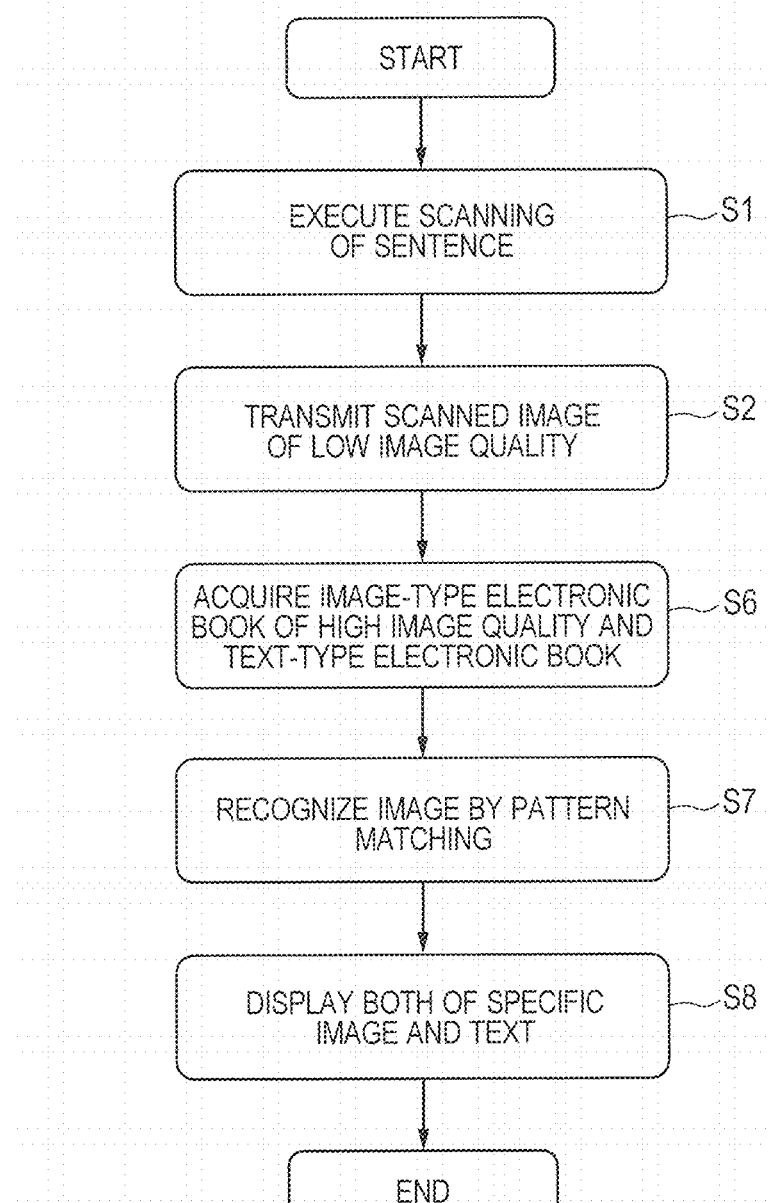
FIG. 9 is a flowchart illustrating one example of an operation of a scanning system according to the second embodiment.

Then, one example of an operation of the scanning system 1 according to the second embodiment will be described with reference to FIG. 9. Incidentally, since step S1 and step S2 are the same as step S1 and step S2 in the operation of the scanning system 1 according to the first embodiment that has been described with reference to FIG. 4, description thereof is omitted.

The electronic book download unit 33 of the user terminal 3 downloads the plurality of image-type electronic books of high image quality and the plurality of text-type electronic books from the server 4 in accordance with reception of a scanning result from the pen-shaped scanner 2 (S6).

The pattern matching unit 34 of the user terminal 3 performs the pattern matching process on the scanning result image data obtained by coupling together the plurality of pieces of image data received as the scanned images and on the plurality of image-type electronic books downloaded from the server 4 (S7). That is, the pattern matching unit 34 extracts the range that matches the scanning result image data from the image-type electronic book of high image quality by performing the pattern matching process and generates the partial image data as the data on the extracted range. In addition, the pattern matching unit 34 extracts the range that corresponds to the range extracted from the image-type electronic book from the text-type electronic book and generates partial text data as the data on the extracted range.

The display unit 35 of the user terminal 3 displays an image that the partial image data obtained from the image-type electronic book by the pattern matching process indicates and a text that the partial text data obtained from the text-type electronic book also by the pattern matching process indicates on the display (S8). In addition, the control unit 32 operates so as to save the partial image data and the partial text data that have been extracted respectively from the image-type electronic book and the text-type electronic book by the pattern matching process into the storage unit.

As described above, in the second embodiment, book text data obtained by electronically textizing the sentence described in the paper book is stored into the book text database 43. The pattern matching unit 34 extracts the partial text data that corresponds to the partial image data that has been decided to match the sentence image data (corresponding to the scanning result image data) in the book image data from the book text data.

Owing to the above-mentioned operation, such an advantage is obtained that it is not requested to execute OCR when extracting the text from the scanning result. Although the accuracy in character recognition by OCR is high, the accuracy may not be 100% and there may be a possibility that erroneous recognition may occur. In contrast, in the second embodiment, the book text data in the book text database 43 is selected so s to obtain the text of the character string that has been scanned. Since OCR is not performed in this way, it is possible to avoid the possibility of occurrence of erroneous recognition caused by OCR.

Third Embodiment

Then, the third embodiment will be described. In the following description of the third embodiment, the same numerals are assigned to the same elements as those in the first embodiment and description thereof is appropriately omitted.

Figure 10:
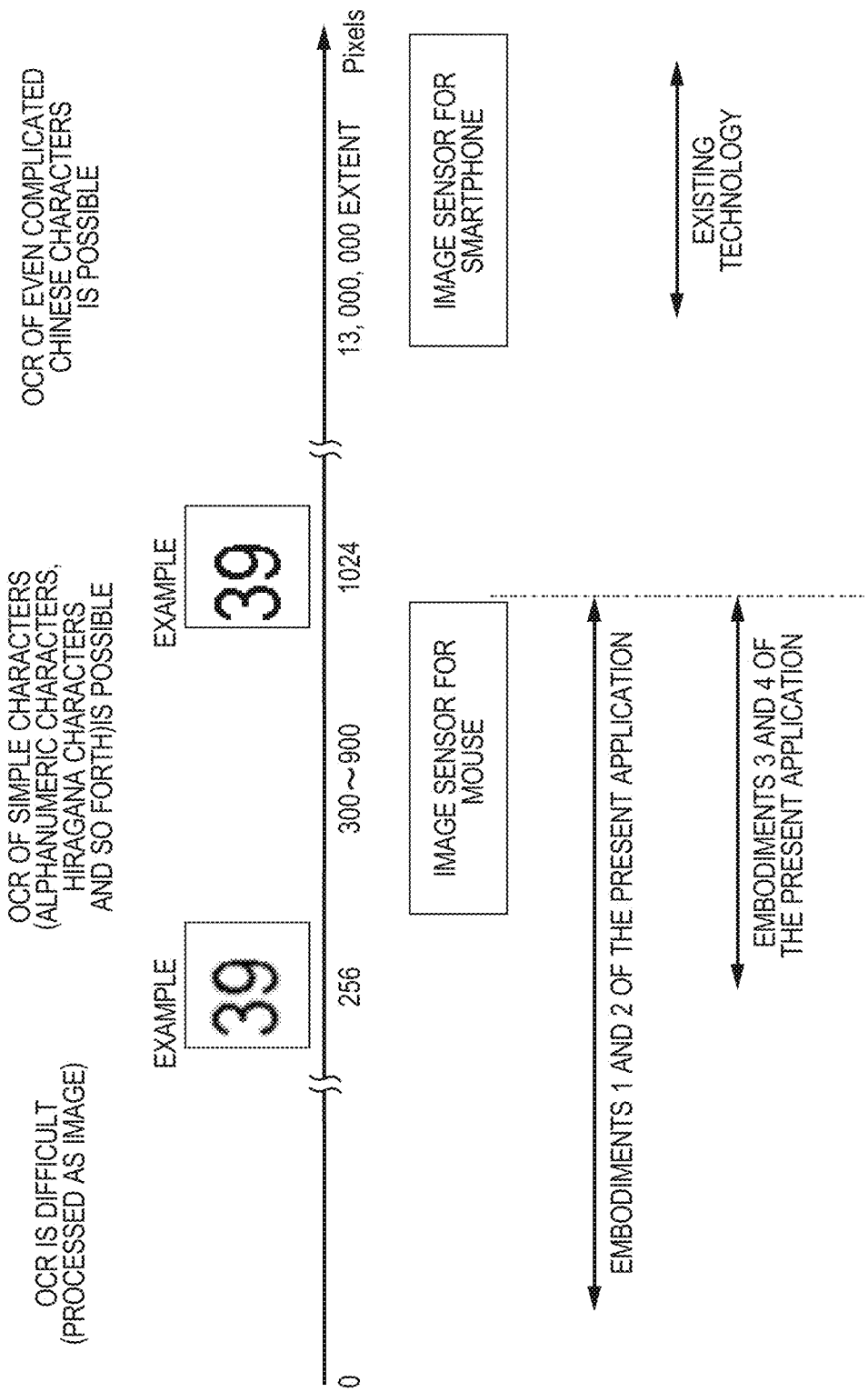
FIG. 10 is a diagram illustrating one example of a relation between resolution and OCR processing capability of an image sensor.

Here, before describing the third embodiment, a relation between a resolution and an OCR processing capability of the image sensor will be described. FIG. 10 illustrates one example of rough standards for the resolution (the number of pixels) of the image sensor and propriety of OCR. As illustrated in FIG. 10, the image sensor 22 for mouse used in each embodiment of the present invention has a resolution of about 300 to about 900 pixels. FIG. 10 illustrates results of scanning of the numeral "39" obtained when the number of pixels amount to about 256 and about 1024. As illustrated in FIG. 10, it is found that even when the number of pixels is decreased down to about 256, it is possible to still recognize the numeral as "39" as a result of scanning it. That is, it is found that it is possible to sufficiently recognize the character by OCR as long as the character to be scanned is a simplified character such as, for example, an alphanumeric character, a Hiragana character (the Japanese cursive syllabary) and so forth irrespective of the resolution (about 300 pixels to about 900 pixels) of the image sensor 22 for mouse that is utilized in each embodiment of the present invention.

Figure 11:
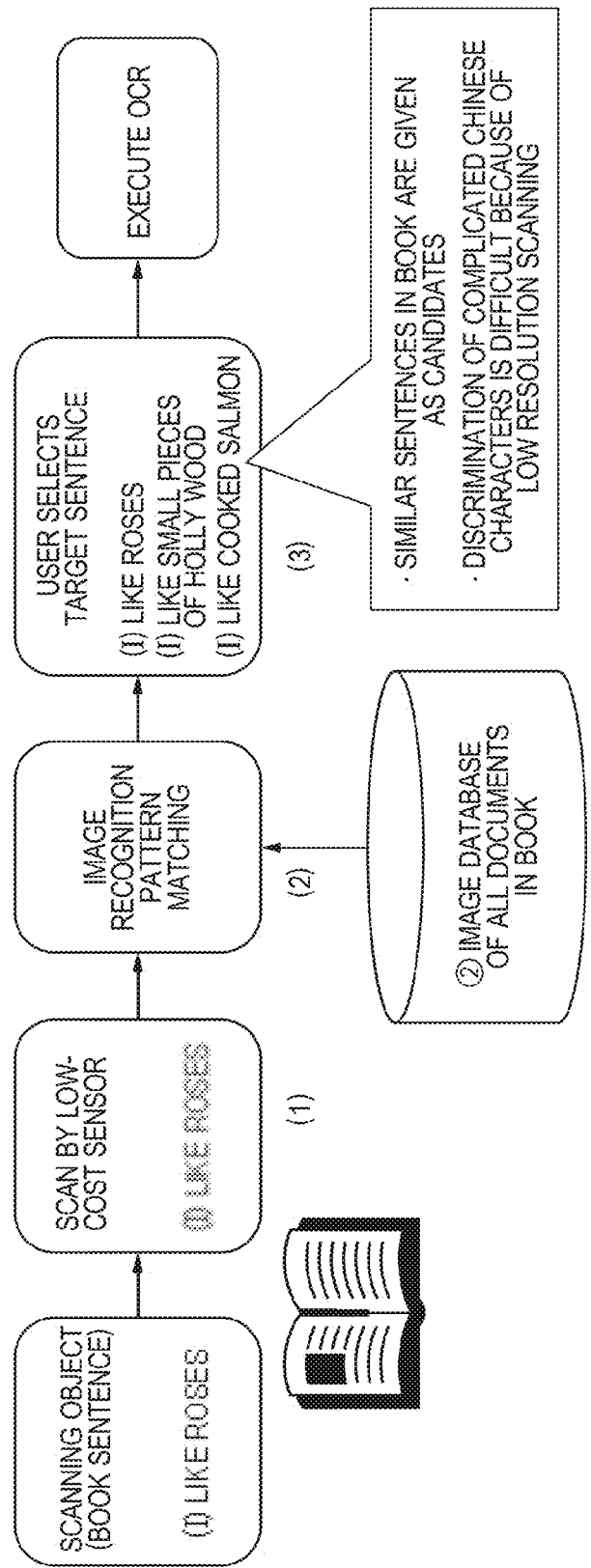
FIG. 11 is a diagram illustrating one example of labor and inefficiency of the pattern matching process.

Then, one example of labor and inefficiency of the pattern matching process will be described with reference to FIG. 11. For example, as illustrated in FIG. 11, it is assumed that the character string "I like roses" has been scanned from the paper book. Due to scanning with the use of the low-cost image sensor 22, it is difficult to read the complicated Chinese character "bara" and the identification accuracy of the character "bara" is low even in the pattern matching process. Examples of the labor and the inefficiency that would occur in the above-mentioned situation are illustrated in FIGS. 11 as (1) to (3).

That is, when the scanning result image data obtained by scanning and the book image data on all of the electronic books in the book image database 41 are subjected to the pattern matching process, a processing time taken for the pattern scanning process is prolonged and hence it is inefficient to perform the pattern matching process in the above-mentioned manner. In addition, there is such a possibility that the accuracy may be lowered for reasons that, for example, a plurality of matching candidates are detected. Accordingly, such extra work is also generated that it is requested to lengthen the character string to be scanned in order to avoid The above-mentioned possibility or it is requested to select one appropriate candidate from within the plurality of matching candidates as the result of scanning.

As measures for improving the labor and the inefficiency as mentioned above, it is effective to reduce a data volume of data to be compared with the scanning result image when performing the pattern matching process. Therefore, in the following third and fourth embodiments, methods of improving the labor and the inefficiency of the pattern matching process will be described. First, in the third embodiment, as a method of reducing the data volume of the data to be compared with the scanning result image when performing the pattern matching process, data narrowing is performed by utilizing the paper book that has been scanned and the attribute information of the sentences described in the paper book.

In the following, one example that the ISBN number and the page number are utilized as the attribute information of the sentence for which data to be compared in the pattern matching process is narrowed down will be described. That is, as described with reference to FIG. 10, data narrowing is performed by utilizing the fact that it is possible even for the image sensor 22 for mouse (the resolution ranges from about 300 pixels to about 900 pixels) to sufficiently recognize the characters by OCR and also by utilizing the ISBN number and the page number denoted in alphanumeric characters when the characters are the simplified characters such as the alphanumerical characters, the Hiragana characters and so forth.

Accordingly, as illustrated in FIG. 10, in the third and fourth embodiments that the attribute information is subjected to OCR, the resolution of the image sensor 22 may be within a range from, for example, about 256 pixels to about 1024 pixels, not limited to the range from about 300 pixels to about 900 pixels. In the first and second embodiments, since it is not requested to subject the attribute information to OCR, the resolution of the image sensor 22 may be not more than about 256 pixels.

Figure 12:
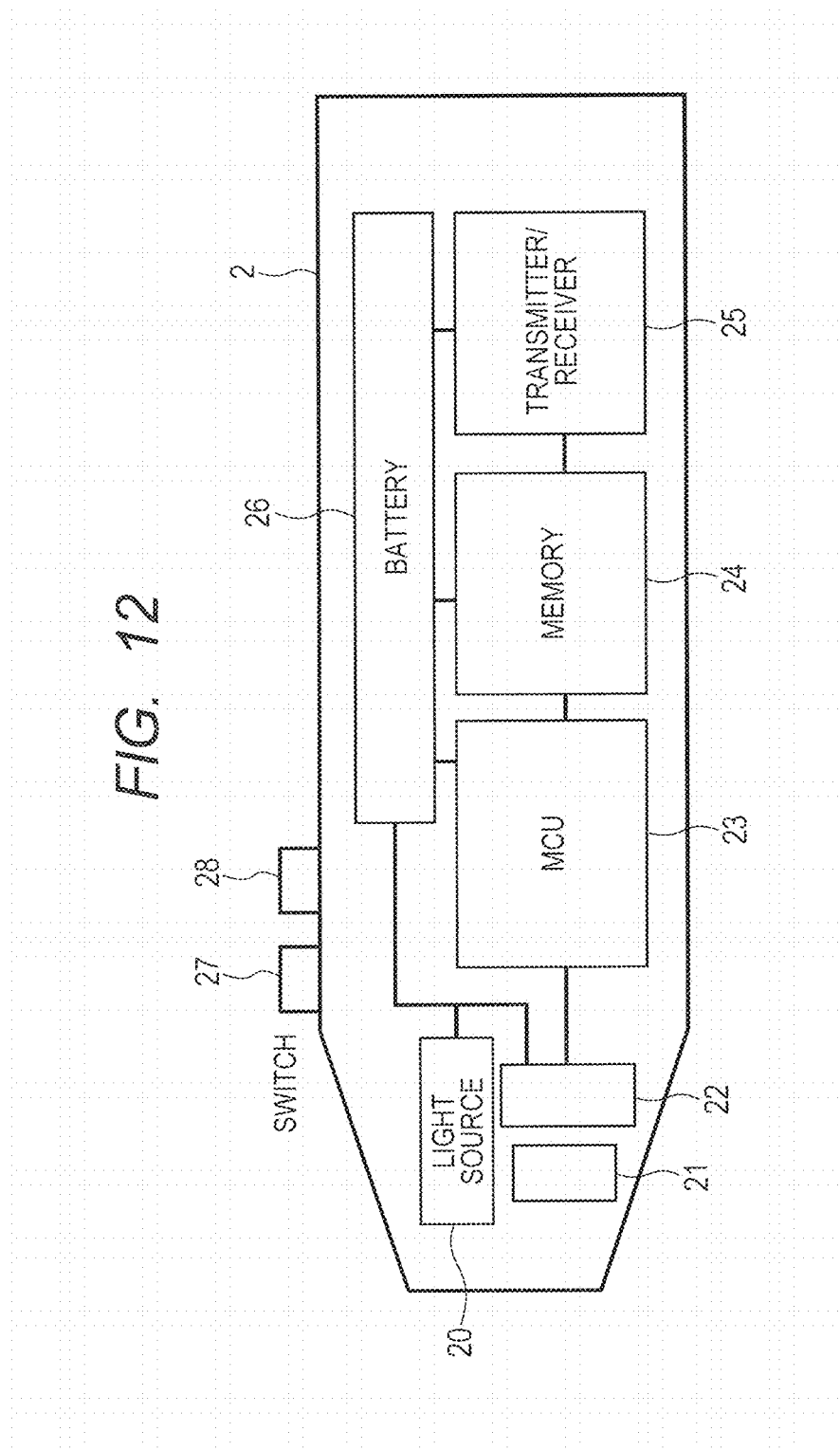
FIG. 12 is a configurational diagram illustrating one example of a pen-shaped scanner according to a third embodiment.

Since the configuration of the scanning system 1 according to the third embodiment is the same as that in the first embodiment, description thereof is omitted. Then, one example of a configuration of the pen-shaped scanner 2 according to the third embodiment will be described with reference to FIG. 12. As illustrated in FIG. 12, the pen-shaped scanner 2 according to the third embodiment is different from the pen-shaped scanner 2 according to the first embodiment in the point that the pen-shaped scanner 2 according to the third embodiment further includes a switch 28.

The switch 28 is an input unit through which whether the ISBN number of the paper book concerned and the page number of the page as the scanning object denoted on the paper book are scanned is input by the user. When the ISBN number and the page number are being scanned, the user depresses the switch 28. On the other hand, when the ISBN number and the page number are not scanned, the user does riot depress the switch 28.

More specifically, when the switch 28 is being depressed, the switch 28 outputs a signal indicating that the switch 28 is being depressed to the MCU 23. On the other hand, when the switch 28 is not depressed, the switch 28 outputs a signal indicating that the switch 28 is not depressed to the MCU 23. When the switch 28 is being depressed, the MCU 23 stores the image data that the image sensor 22 has generated into the memory 24 on the basis of the signal output from the switch 28. On the other hand, when the switch 28 is not depressed, the MCU 23 does not store the image data that the image sensor 22 has generated into the memory 24 on the basis of the signal output from the switch 28.

Accordingly, the image data that is generated by scanning performed while the switch 28 is being depressed and stored into the memory 24 is utilized as image data for acquiring the ISBN number and the page number by OCD as described later. This image data will be also called "OCR image data" hereinafter.

On the other hand, as described so far, the image data that is generated by the scanning operation performed while the switch 27 is being depressed and stored into the memory 24 is utilized as the image data obtained by scanning an optional character in the sentence described in the paper book. In the following, the image data will be also called "character image data".

Accordingly, the transmitter/receiver 25 of the pen-shaped scanner 2 according to the third embodiment is different from the transmitter/receiver 25 according to the first embodiment in the point that the transmitter/receiver 25 according to the third embodiment transmits also the plurality of pieces of OCR image data stored in the memory 24 to the user terminal 3 in addition to the plurality of pieces of character image data stored in the memory 24.

Figure 13:
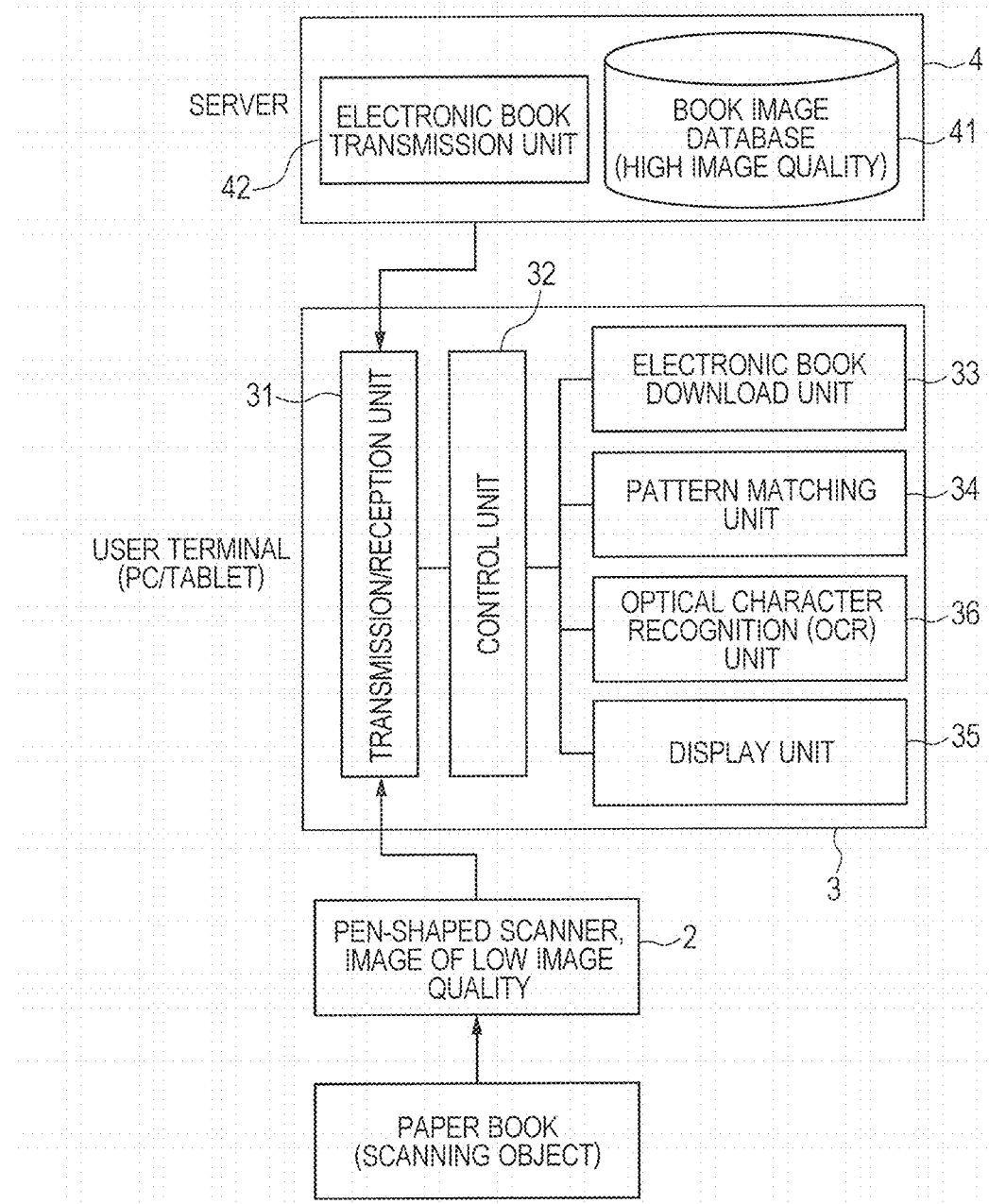
FIG. 13 is a configurational diagram illustrating one example of a user terminal and a server according to the third embodiment.

Then, one example of configurations of the user terminal 3 and the server 4 according to the third embodiment will be described with reference to FIG. 13. As illustrated in FIG. 13, the user terminal 3 according to the third embodiment is different from the user terminal 3 according to the first embodiment in the point that the user terminal 3 according to the third embodiment further includes an optical character recognition (OCR) unit 36.

The optical character recognition unit 36 couples together the plurality of pieces of image data concerned so as to superimpose overlapped parts of the plurality of images that the plurality of pieces of OCR image data that have been generated when the ISBN number has been scanned indicate in the plurality of pieces of OCR image data that have been received from the pen-shaped scanner 2 via the transmission/reception unit 31 and thereby obtains the image data that indicates the character string of the ISBN number of the paper book that the user has scanned using the pen-shaped scanner 2 as the image. The optical character recognition unit 36 performs OCR on the obtained image data and thereby acquires the text of the ISBN number.

In addition, the optical character recognition unit 36 couples together the plurality of pieces of image data concerned so as to superimpose the overlapped parts of the plurality of images that the plurality of pieces of OCR image data that have been generated when the page number has been scanned indicate in the plurality of pieces of OCR image data that have been received from the pen-shaped scanner 2 via the transmission/reception unit 31 and thereby obtains the image data that indicates the character string of the page number denoted on the paper book that the user has scanned using the pen-shaped scanner 2 as the image. The optical character recognition unit 36 performs OCR on the obtained image data and thereby acquires the text of the page number.

Here, since the ISBN number and the page number are scanned at different timings, the optical character recognition unit 36 may decide mutually corresponding two OCR image data groups on the basis of scan times that scan time data included in the OCR image data indicates. For example, it may be decided such that when the scan times of the respective two pieces of OCR image data are less than a predetermined time, these two pieces of OCR image data are included in the same OCR image data group, while when the scan times of the respective two pieces of OCR image data are at least the predetermined time, these two pieces of OCR image data are included in the mutually different OCR image data groups. According to the third embodiment so configured, it is possible to obtain the two pieces of image data that respectively indicate the ISBN number and the pager number by coupling together the plurality of pieces of OCR image data in each of the two OCR image data groups. However, at this stage, which image data indicates which one of the ISBN number and the image number is not found.

Accordingly, when the character string "ISBN" is included in the character string that has been obtained as the text as a result of execution of OCR, the optical character recognition unit 36 decides that the character string that has been obtained as the result of execution of OCR is the ISBN number. On the other hand, when the character string "ISBN" is not included in the character string that has been obtained as the text as the result of execution of OCR, the optical character recognition unit 36 decides that the character string that has been obtained as the result of execution of OCR is the page number.

Then, the electronic book download unit 33 according to the third embodiment transmits the data that indicate the ISBN number and the page number that the optical character recognition unit 36 has acquired to the server 4 as request data used for requesting transmission of the electronic book concerned.

The electronic book transmission unit 42 of the server 4 according to the third embodiment narrows down the data to be transmitted to the user terminal 3 on the basis of the ISBN number and the page number that the request data that has been received from the user terminal 3 indicates.

Here, one example of data-narrowing performed by the electronic book transmission unit 42 will be described with reference to FIG. 14.

Figure 14:
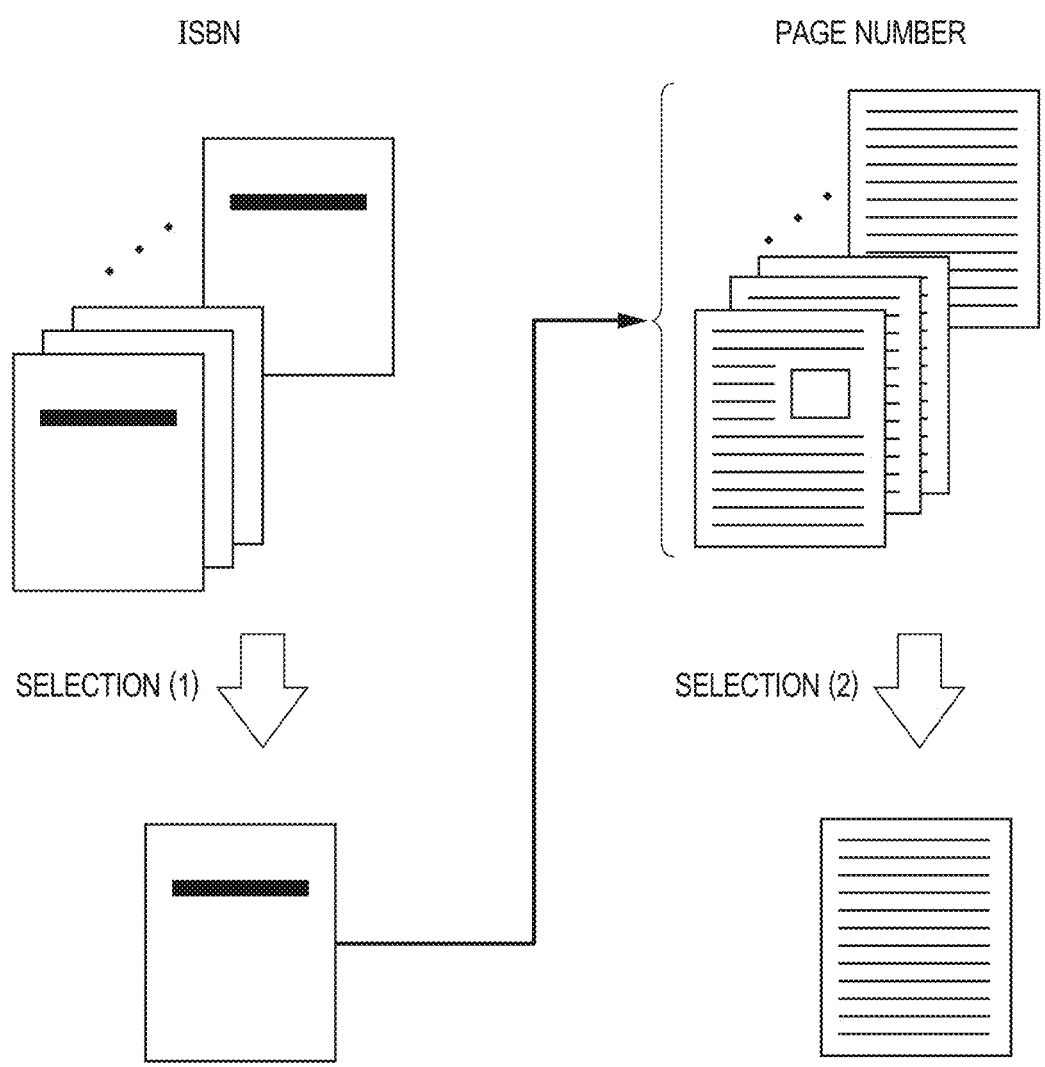
FIG. 14 is a conceptual diagram illustrating one example of an operation of specifying desirable book image data from within a book image database.

First, the electronic book transmission unit 42 selects the electronic book having the ISBN number that the request data indicates from within the plurality of electronic books included in the book image database 41 (Selection (1) in FIG. 14). For this selection, for example, information that the electronic book concerned is set in correspondence with the ISBN number assigned to the electronic book may be stored in advance into the storage unit of the server 4 and the electronic book transmission unit 42 may specify the electronic book corresponding to the ISBN number that the request data indicates on the basis of the information.

Then, the electronic book transmission unit 42 selects the book image data on the page corresponding to the page number that the request data indicates from the selected electronic book (Selection (2) in FIG. 14). For this selection, for example, information that the page number concerned is set in correspondence with the book image data on the page corresponding to the page number concerned may be stored in advance into the storage unit of the server 4 and the electronic book transmission unit 42 may specify the book image data corresponding to the page number that the request data indicates on the basis of the information.

Thereby, only the book image data on the page corresponding to the page number that the user has scanned using the pen-shaped scanner 2 is selected in the electronic book corresponding to the ISBN number that the user has scanned using the pen-shaped scanner 2. Then, the electronic book transmission unit 42 transmits the selected book image data to the user terminal 3 as the electronic book.

Owing to the above-mentioned operation, the pattern matching unit 34 of the user terminal 3 is allowed not to compare the pieces of book image data of the all pages of all electronic books stored in the server 4 with the scanning result image data. That is, the pattern matching unit 34 is allowed to simply compare the book image data of one page that has been transmitted from the server 4 with the scanning result image data. Accordingly, it is possible to reduce the data volume of the data to be compared when performing the pattern matching process. Accordingly, the processing time taken for the pattern matching process is reduced and improvement of accuracy in processing result is expected.

Figure 15:
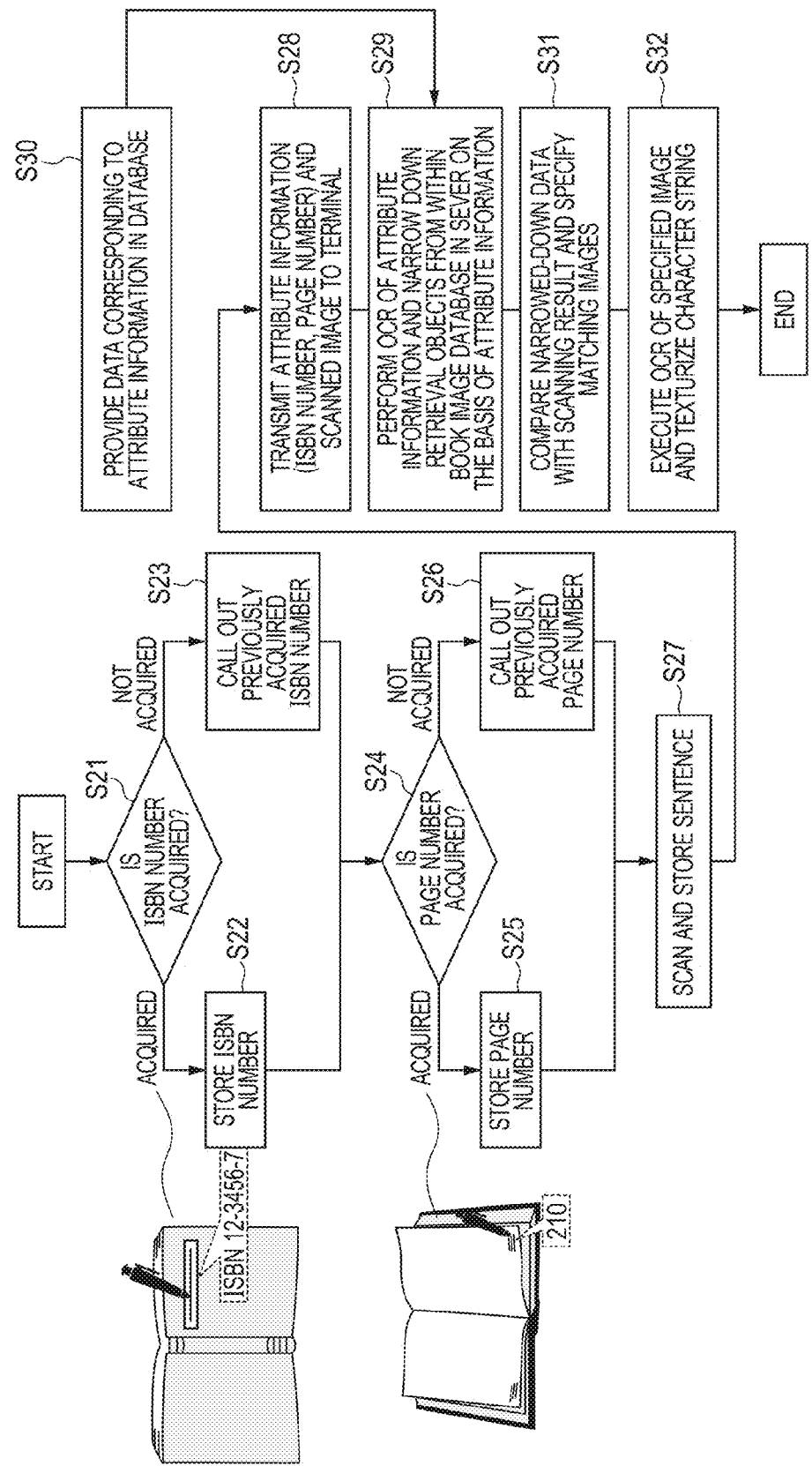
FIG. 15 is a flowchart illustrating one example of an operation of a scanning system according to the third embodiment.

Then, one example of the operation of the scanning system 1 according to the third embodiment will be described with reference to FIG. 15.

The user scans the character string of the ISBN number from the paper book by using the pen-shaped scanner 2. That is, the MCU 23 of the pen-shaped scanner 2 stores the plurality of pieces of OCR image data that are generated by the image sensor 22 while the switch 28 is being depressed into the memory 24 (S21: Acquired, S22). The character string that the image data obtained by coupling together the plurality of pieces of OCR image data indicates becomes the ISBN number.

The user scans the page number denoted on the page on which an optional character string (for example, one sentence) in the sentences of the paper book that the user has determined to scan is described by using the pen-shaped scanner 2. That is, the MCU 23 of the pen-shaped scanner 2 stores the plurality of pieces of OCR image data that are generated by the image sensor 22 while the switch 28 is being depressed into the memory 24 (S24: Acquired, S25). The character string that the image data that is obtained by coupling together the plurality of pieces of OCR image data indicates becomes the page number of the page on which the sentence that includes the character string that the user scans is described.

On the other hand, when scanning of the ISBN number utilizing the switch 28 has not been performed (S21: Not Acquired), the previously acquired ISBN number is utilized (S23). In addition, when scanning of the page number utilizing the switch 28 has not been performed (S24: Not Acquired), the previously acquired page number is utilized (S26). That is, for example, on the user terminal 3 side, when although the character image data has been acquired by using the pen-shaped scanner 2, the OCR image data has not been acquired (when only the character string in the sentence has been scanned using the pen-shaped scanner 2), the electronic book download unit 33 of the user terminal 3 may utilize the ISBN number or the page number that the optical character recognition unit 36 has previously acquired.

The user selects the optional character string (for example, one sentence) from within the sentences described in the paper book and scans the optional character string by using the pen-shaped scanner 2. Describing in more detail, the MCU 23 of the pen-shaped scanner 2 stores the plurality of pieces of image data that are generated by the image sensor 22 while the switch 27 is being depressed into the memory 24 (S27).

The transmitter/receiver 25 of the pen-shaped scanner 2 transmits the plurality of pieces of character image data and the plurality of pieces of OCR image data stored in the memory 24 to the user terminal 3 (S28).

The optical character recognition unit 36 acquires the text of the ISBN number and the text of the page number by performing OCR on the image obtained by coupling together the plurality of images that the plurality of pieces of OCR image data that have been received from the pen-shaped scanner 2 indicate so as to superimpose the overlapped parts. Then, the electronic book download unit 33 transmits the request data indicating the ISBN number and the page number that have been acquired by the optical character recognition unit 36 to the server 4 in order to narrow down the data to be compared from within the data in the book image database 41 (S29).

The electronic book transmission unit 42 of the server 4 transmits the book image data of the page that has been narrowed down on the basis of the ISBN number and the page number that the request data that has been received from the user terminal 3 indicates to the user terminal 3 as the electronic book (S30).

The pattern matching unit 34 of the user terminal 3 compares the book image data that has been received from the server 4 with the scanning result image data obtained by coupling together the plurality of pieces of character image data that have been received from the pen-shaped scanner 2 and specifies the partial image data that matches the scanning result image data from the book image data (S31).

The optical character recognition unit 36 performs OCR on the partial image data that has been specified from the book image data and textizes the character string in the partial image data (S32).

Figure 16:
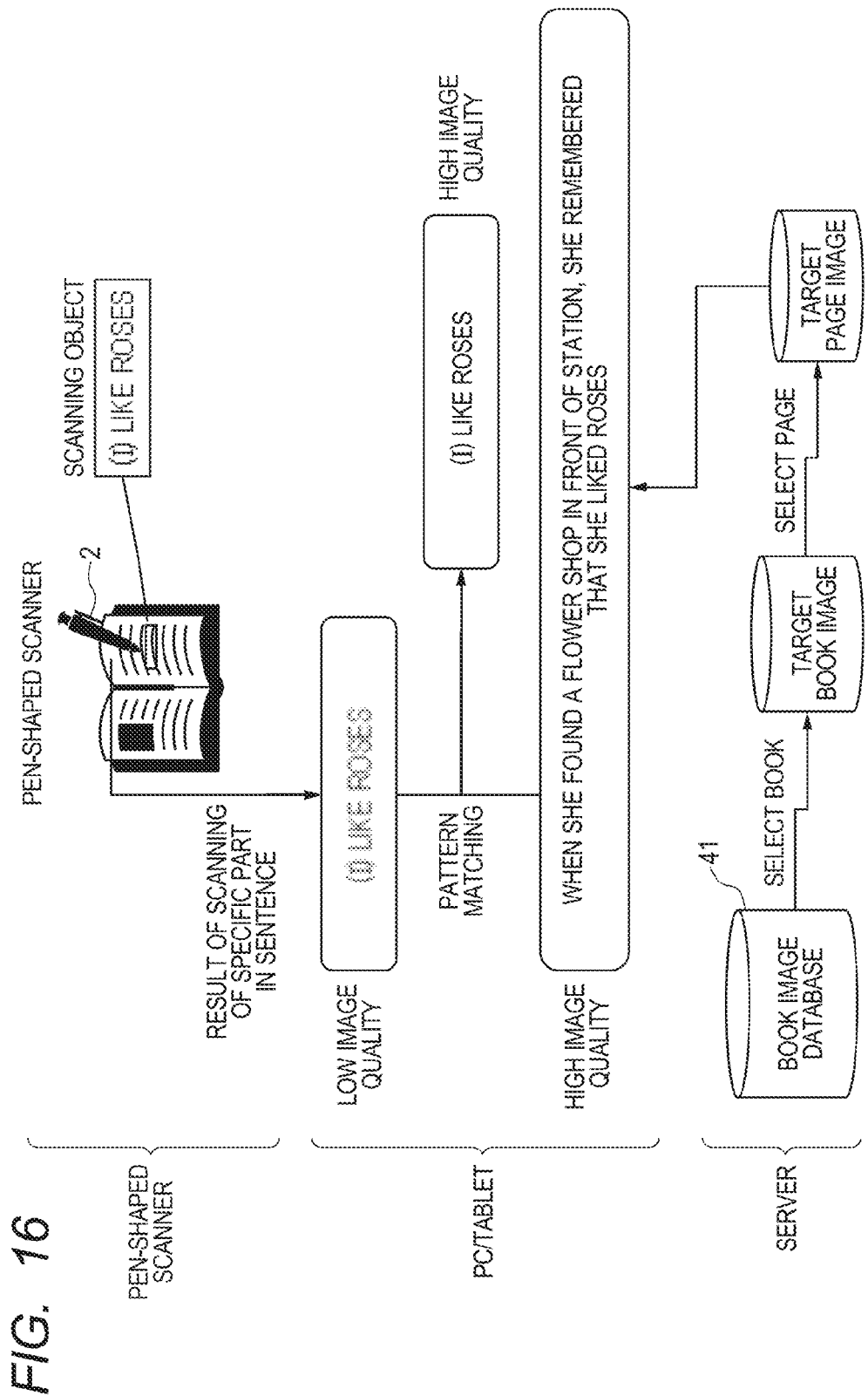
FIG. 16 is a conceptual diagram illustrating one example of a pattern matching process according to the third embodiment.

Here, a conceptual diagram of processing in step S21 to step S31 is illustrated in FIG. 16. The processing in FIG. 16 is different from the processing according to the first embodiment illustrated in FIG. 5 in the point that the images to be compared with the scanning result images obtained by scanning the character string in the sentence using the pen-shaped scanner 2 are narrowed down to the images of one page of one book. That is, the plurality of pieces of book image data stored in the book image database 41 are narrowed down to the plurality of pieces of book image data that configure one book on the basis of the ISBN number and the plurality of pieces of book image data so narrowed down are further narrowed down to the book image data of one page on the basis of the page number.

Figure 17:
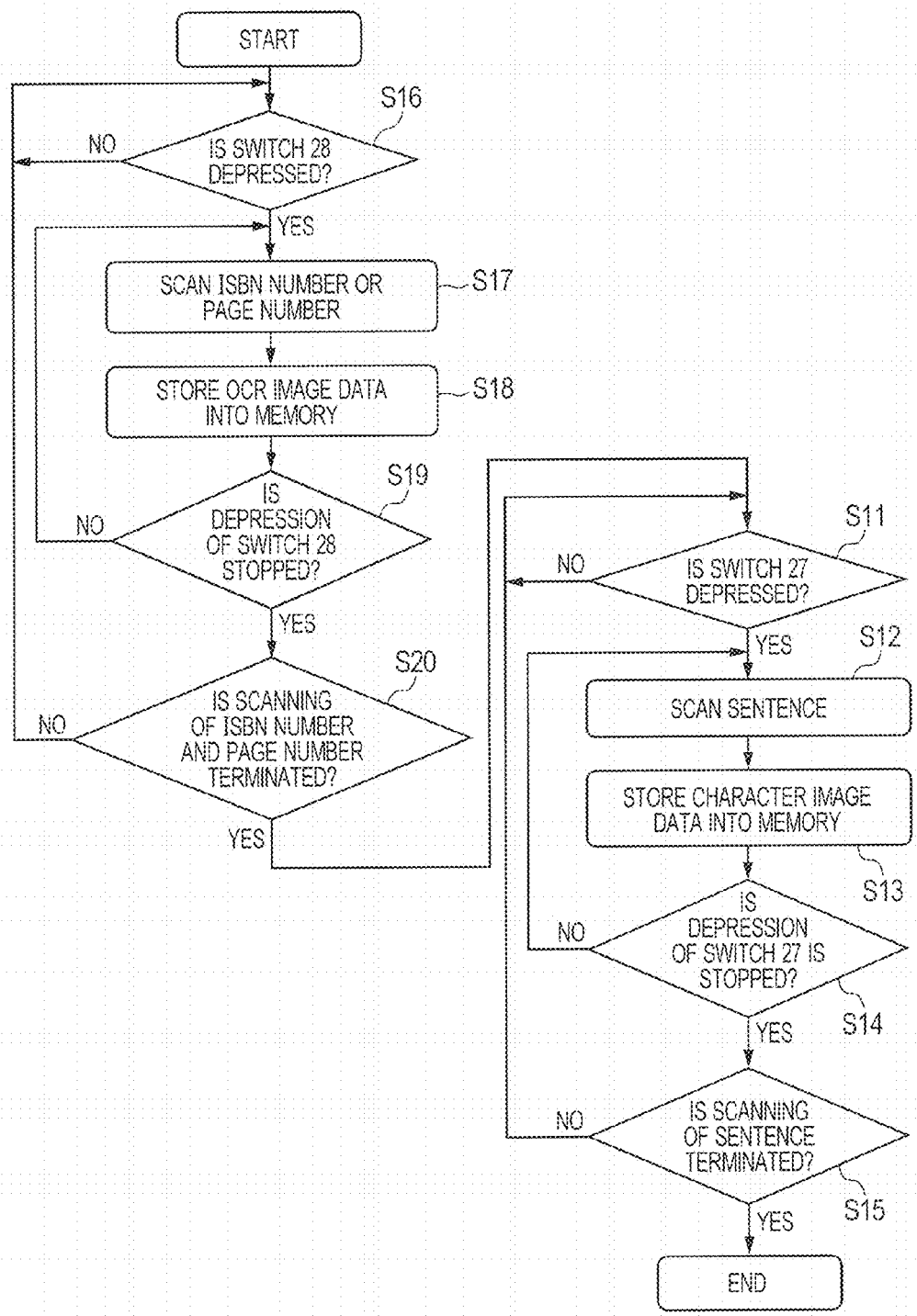
FIG. 17 is a flowchart illustrating one example of an operation of the pen-shaped scanner according to the third embodiment.

Then, detailed operations in step S21 to step S25 and step S27 will be described with reference to FIG. 17. Step S21 to step S23 correspond to step S16 to step S20, and step S27 corresponds to step S11 to step S15.

The MCU 23 of the pen-shaped scanner 2 decides whether the user is depressing the switch 28 on the basis of the signal output from the switch 28 (S16). When it has been decided that the user is depressing the switch 28 (S18: Yes), the MCU 23 stores the OCR image data obtained by scanning one part of the ISBN number or the page number into the memory 24 (S17, S18).

The MCU 23 decides whether the user is depressing the switch 28 on the basis of the signal output from the switch 28 (S19). When it has been decided that the user is depressing the switch 28 (S19: No), the MCY 23 continuously stores the image data obtained by scanning one part of the ISBN number or the page number into the memory 24 (S17, S18). That is, the MCU 23 stores the OCR image data that the image sensor 22 generates occasionally while the switch 28 is being depressed by the user into the memory 24. Thereby, the plurality of pieces of OCR image data obtained while the switch 28 is being depressed are stored into the memory 24.

When it has been decided that the user does not depress the switch 28 after the user has performed the scanning operation (S19: Yes), the MCU 23 decides whether scanning of the ISBN number and the page number has been terminated (S20). As a decision condition thereof, for example, either of the following conditions (1) and (2) is adopted.

(1) Whether scanning of the sentence has been terminated is decided depending on whether an operation of stopping depression of the switch 28 has been repeated two times after the user has depressed the switch 28.

(2) An end switch (not illustrated) is further installed on the pen-shaped scanner 2 and whether scanning of the ISBN number and the page number has been terminated is decided depending on whether the end switch has been depressed.

That is, in case of the decision condition (1), when a decision that the user does not depress the switch 28 (S19: Yes) is made two times, the MCU 23 decides that scanning of the ISBN number and the page number has been terminated (S20: Yes). When adopting the decision condition (1), counting of the number of times that the user has stopped depression of the switch 28 may be initialized, for example, after termination of the processing up to step S15. On the other hand, in case of the decision condition (2), when the end switch has been depressed after it has been decided that the user does not depress the switch 28 (S19: Yes), it is decided that scanning of the ISBN number and the page number has been terminated (S20: Yes).

Incidentally, although in the third embodiment, an example that the ISBN number and the page number are scanned as the attribute information and the pieces of book image data to be compared in the pattern matching process are narrowed down to the data (one piece of book image data) of one page has been described, the present invention is not limited to this example. For example, as the attribute information, the ISBN number may be scanned and the pieces of book image data to be compared in the pattern matching process may be narrowed down to the plurality of pieces of book image data included in the electronic book corresponding to the scanned ISBN number.

As described above, in the third embodiment, the pen-shaped scanner 2 includes the switch 28 that the user depresses when scanning the character string of the ISBN number denoted on the paper book concerned, and generates and transmits ISBN number image data obtained by electronically imaging the character string of the ISBN number that has been scanned while the switch 28 is being depressed. The optical character recognition unit 36 performs OCR on the ISBN number image data that has been transmitted from the pen-shaped scanner 2 and generates text data obtained by electronically textizing the character string of the ISBN number. The electronic book transmission unit 42 selects the book image data corresponding to the paper book having the ISBN number that the text data that has been generated by the optical character recognition unit 36 indicates in the plurality of pieces of book image data stored in the book image database 41.

Further, the switch 28 is depressed when the user scans the character string of the page number denoted on the page on which the sentence that includes the character string that the user scans as one part of the sentence is described. The pen-shaped scanner 2 generates and transmits page number image data obtained by electronically imaging the character string of the page number that has been scanned while the switch 28 is being depressed. The optical character recognition unit 36 performs OCR on the page number image data that has been transmitted from the pen-shaped scanner 2 and generates the text data obtained by electronically textizing the character string of the page number. The electronic book transmission unit 42 further selects the book image data corresponding to the page number that the text data that the optical character recognition unit 36 has generated indicates from within the book image data of the paper book corresponding to the ISBN number.

Then, the patter matching unit 34 compares the book image data that the electronic book transmission 42 has selected with sentence image data.

Owing to the above-mentioned operation, since the pattern matching process is performed only on the book image data that has been narrowed down on the basis of the attribute information in the book image database 4, it is possible to implement speeding-up of the process and improvement of character recognition accuracy.

Fourth Embodiment

Then, the fourth embodiment will be described. Also in the fourth embodiment, one example of the method of improving the labor and the inefficiency of the pattern matching process will be described. In the third embodiment, as the method of reducing the data volume of the data to be compared when performing the patter matching process, the example that data narrowing is performed by utilizing the attribute information of the book and the sentence in the book subjected to the scanning operation has been described. While, in the fourth embodiment, the labor and the inefficiency of the pattern matching process are more improved by performing data narrowing to such an extent that a sentence in which area on the page concerned has been scanned.

Figure 18:
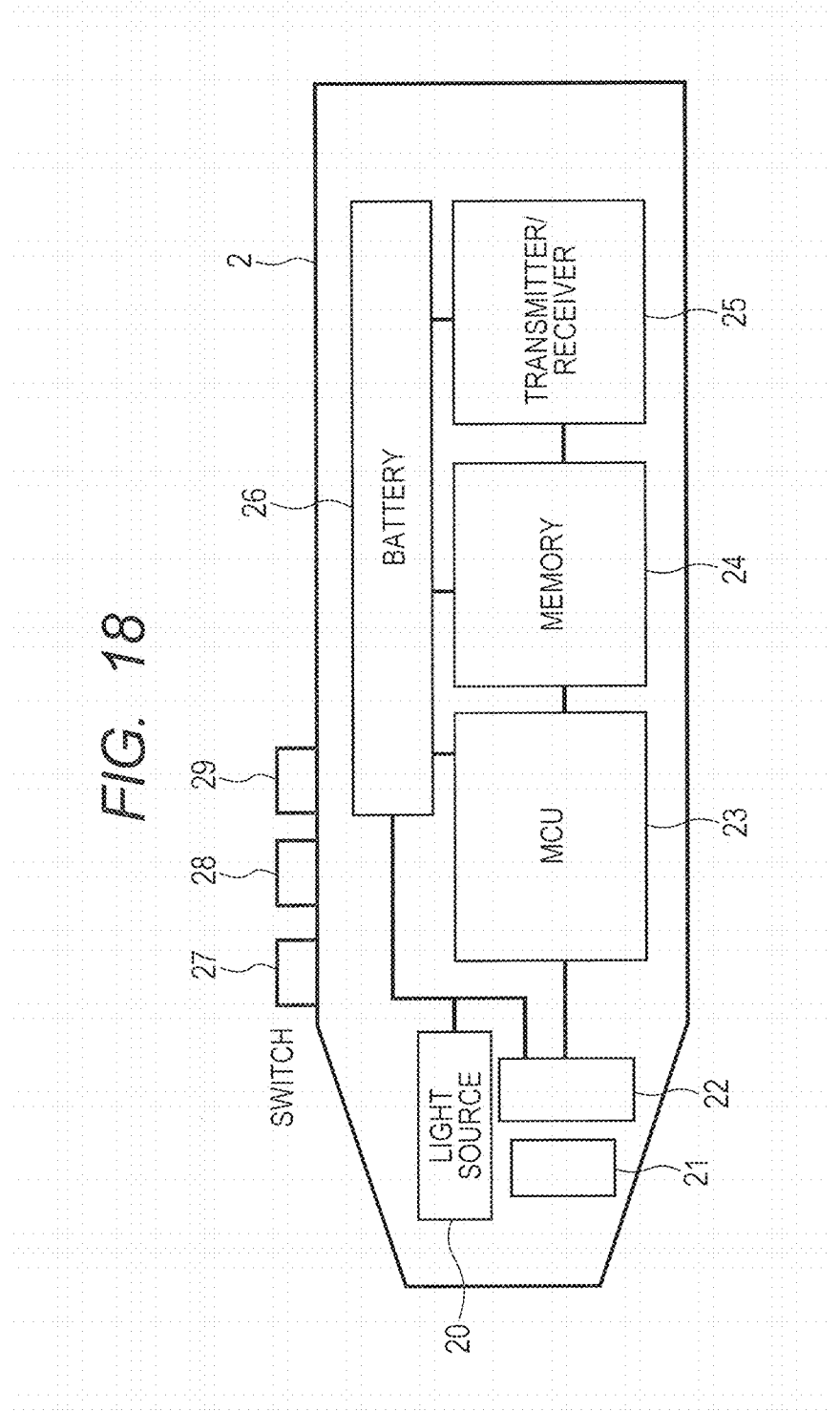
FIG. 18 is a configurational diagram illustrating one example of a pen-shaped scanner according to a fourth embodiment.

Since the configuration of the scanning system 1 according to the fourth embodiment is the same as that of the scanning system 1 according to the third embodiment, description thereof is omitted. Then, with reference to FIG. 18, one example of the configuration of the pen-shaped scanner 2 according to the fourth embodiment will be described. As illustrated in FIG. 18, the pen-shaped scanner 2 according to the fourth embodiment is different from the pen-shaped scanner 2 according to the third embodiment in the point that the pen-shaped scanner 2 according to the fourth embodiment further includes a switch 29.

The switch 29 is an input unit through which whether the pen-shaped scanner 2 is moved from a position that the page number of the page to be scanned on the paper book concerned has been scanned to the character string to be scanned in the sentence concerned is input. The user depresses the switch 29 while the pen-shaped scanner 2 is being moved from the position that The page number has been scanned to the character string to be scanned in the sentence concerned. On the other hand, when the pen-shaped scanner 2 is not being moved from the position that the page number has been scanned to the character string to be scanned in the sentence concerned, the user does not depress the switch 29.

More specifically, when the switch 29 is depressed, the switch 29 outputs the signal indicating that the switch 29 is depressed to the MCU 23. On the other hand, when the switch 29 is not depressed, the switch 29 outputs the signal indicating that the switch 29 is not depressed to the MCU 23. When it has been found that the switch 29 is depressed on the basis of the signal output from the switch 29, the MCU 23 calculates a gross movement amount (a movement distance and a movement direction) of the pen-shaped scanner 2 obtained after the switch 29 has been depressed on the basis of change amounts (movement amounts) of a plurality of position coordinates that are occasionally acquired from the image sensor 22. The MCU 23 calculates the position coordinate of the pen-shaped scanner 2 when depression of the switch 29 has been stopped on the basis of the gross movement amount of the pen-shaped scanner 2 from the position that the page number has been scanned, with the position coordinate of the pen-shaped scanner 2 when the switch 29 has been depressed being defined ad a reference and generates position coordinate data indicating the position coordinate. On the other hand, when it has been found that the switch 29 is not depressed on the basis of the signal output from the switch 29, the MCU 23 does not calculate the position coordinate of the pen-shaped scanner 2.

Figure 19:
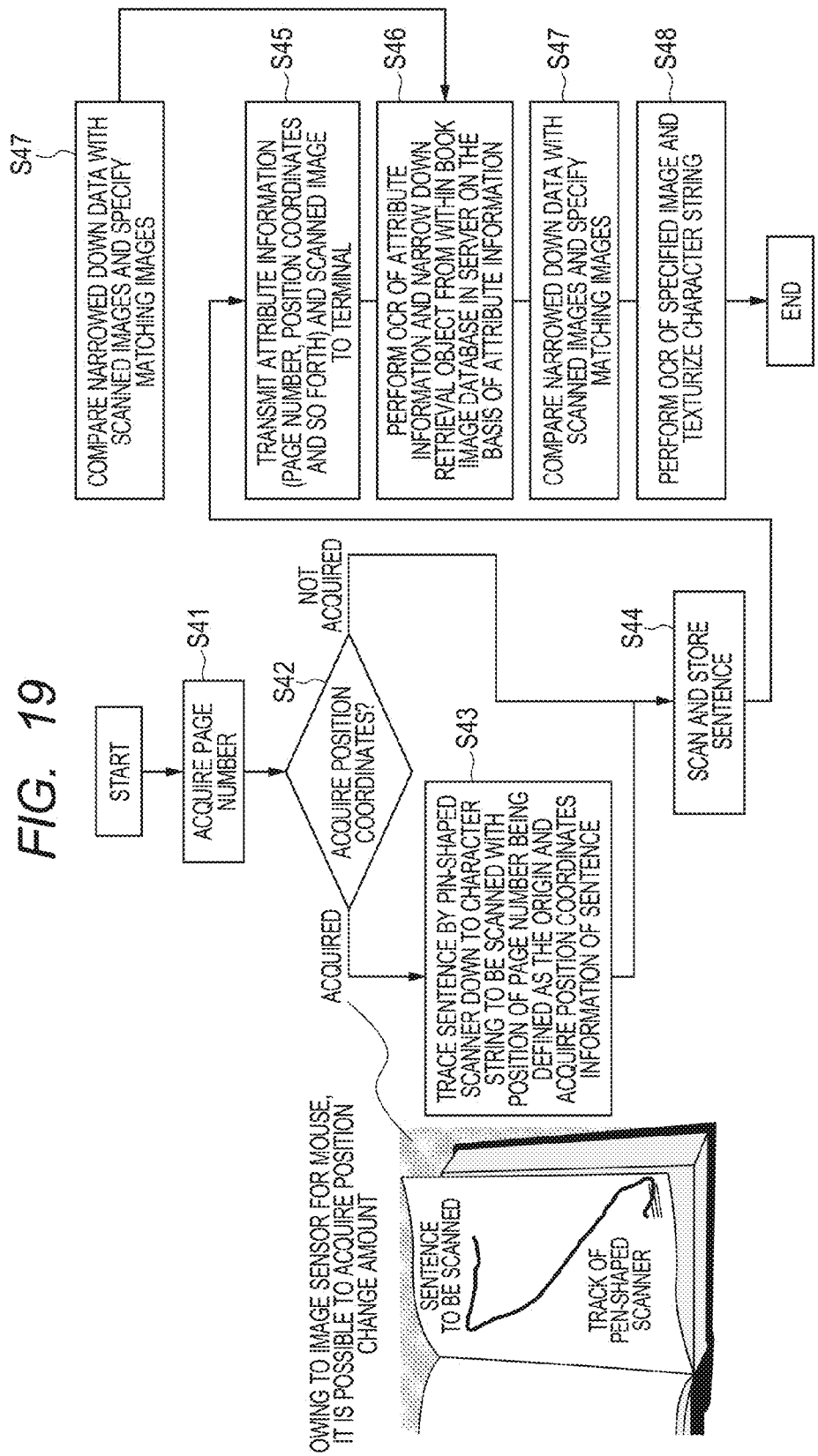
FIG. 19 is a flowchart illustrating one example of an operation of a scanning system according to the fourth embodiment.

Then, one example of the operation of the scanning system 1 according to the fourth embodiment will be described with reference to FIG. 19.

The user scans the page number denoted on the page on which the optional character string (for example, one sentence) that the user has decided to scan from within sentences in the paper book concerned is described (S41).

The user makes the pen-shaped scanner 2 trace the paper book from the position that the page number is denoted up to the character string to be scanned in the sentence while depressing the switch 29. That is, the MCU 23 of the pen-shaped scanner 2 generates the position coordinate data indicating the position coordinate (the position that the character string to be scanned is described in the sentence) of the pen-shaped scanner 2 when depression of the switch 29 has been stopped on the basis of the data indicating the change amounts of the plurality of position coordinates that are generated by the image sensor 22 while the switch 29 is being depressed (S42: Acquired, S43).

The user scans the character string (for example, one sentence) to be scanned in the sentence by using the pen-shaped scanner 2. Describing in more detail, the MCU 23 of the pen-shaped scanner 2 stores the plurality of pieces of image data generated by the image sensor 22 while the switch 27 is being depressed into the memory 24 (S44).

The transmitter/receiver 25 of the pen-shaped scanner 2 transmits the plurality of pieces of character image data, the plurality of OCR image data and the position coordinate data stored in the memory 24 to the user terminal 3 (S45). Incidentally, since the step S46 and step S47 are the same as step 29 and step 30 described with reference to FIG. 15, description thereof is omitted.

The pattern matching unit 34 of the user terminal 3 narrows down the range to be compared with the scanning result image data obtained by coupling together the plurality of pieces of character image data received from the pen-shaped scanner 2 from the book image data (the book image data of one page of the paper book concerned) received from the server 4 on the basis of the position coordinate data received from the pen-shaped scanner 2. Then, the pattern matching unit compares the range that has been narrowed down from the book image data with the scanning result image data and specifies the partial image data that matches the scanning result image data from the range that has been narrowed down from the book image data (S47). Incidentally, when the position coordinate data has not been acquired because the user has not operated the pen-shaped scanner 2 by depressing the switch 29 (S42; Not Acquired), the pattern matching unit 34 may perform the pattern matching process on the book image data of one page and the scanning result image data similarly to the operation described in the third embodiment.

Here, in range narrowing, for example, the range may be narrowed down to a range of a predetermined number of lines (for example, a range of one line or a range of one central line, one line located just before the central line and one line located just behind the central line and so forth), centering on the position coordinate of the pen-shaped scanner 2 when starting scanning of the character string in the sentences that the position coordinate data indicates in the images of one page. In addition, for example, the range may be narrowed down to a range of a predetermined rate (for example, ½, ¼ and so forth) relative to the entire of the images of one page, centering on the position coordinate of the pen-shaped scanner 2 when starting scanning of the character string in the sentence that the position coordinate data indicates in the images of one page. In this case, when the sentence is written horizontally, the range may be narrowed down by the predetermined rate vertically and when the sentence is written vertically, the range may be narrowed down by the predetermined rate horizontally.

The optical character recognition unit 35 performs OCR on the partial image data that has been specified from within the images in the range that has been narrowed down from the book image data and textizes the character string in the image that the partial image data indicates (S48).

As described above, in the fourth embodiment, the pen-shaped scanner 2 includes the switch 29 to be depressed when the user moves the pen-shaped scanner 2 from the position that the page number is denoted in one page of the paper book to the position that the character string that is one part of the sentence is scanned. The image sensor 22 generates movement amount data indicating the movement amount of the pen-shaped scanner 2 on the basis of temporally adjacent pieces of character image data. The pen-shaped scanner 2 calculates the position coordinate of the pen-shaped scanner 2 when depression of the switch 29 has been stopped on the basis of the movement amount that the movement amount data that is generated by the image sensor 22 while the switch 29 is being depressed indicates, with the position coordinate of the pen-shaped scanner 2 obtained when the switch 29 has been depressed being defined as a reference and transmits the position coordinate data indicating the calculated position coordinates. The pattern matching unit 34 specifies the position that the pen-shaped scanner 2 has started scanning of the character string that is one part of the sentence in the book image data on the basis of the position coordinate of the pen-shaped scanner 2 that the position coordinate data that has been transmitted from the pen-shaped scanner 2 indicates and compares a predetermined range with the specified position being set as a reference with the sentence image data.

Owing to the above-mentioned operation, since it is possible to perform narrowing regarding at which position the character string to be scanned is located on the page concerned and pattern matching is performed only in the further narrowed-down range in the book image data that has been narrowed down on the basis of the attribute information in the book image database 41, it is possible to implement speeding-up of the processing and improvement of the character recognition accuracy

Fifth Embodiment

Then, the fifth embodiment will be described. In the following description of the fifth embodiment, the same numerals are assigned to the same elements as those in the above-mentioned fourth embodiment and description thereof is appropriately omitted. Since the configuration of the scanning system 1 and the configuration of the pen-shaped scanner 2 according to the fifth embodiment are the same as those according to the fourth embodiment, description thereof is omitted.

Figure 20:
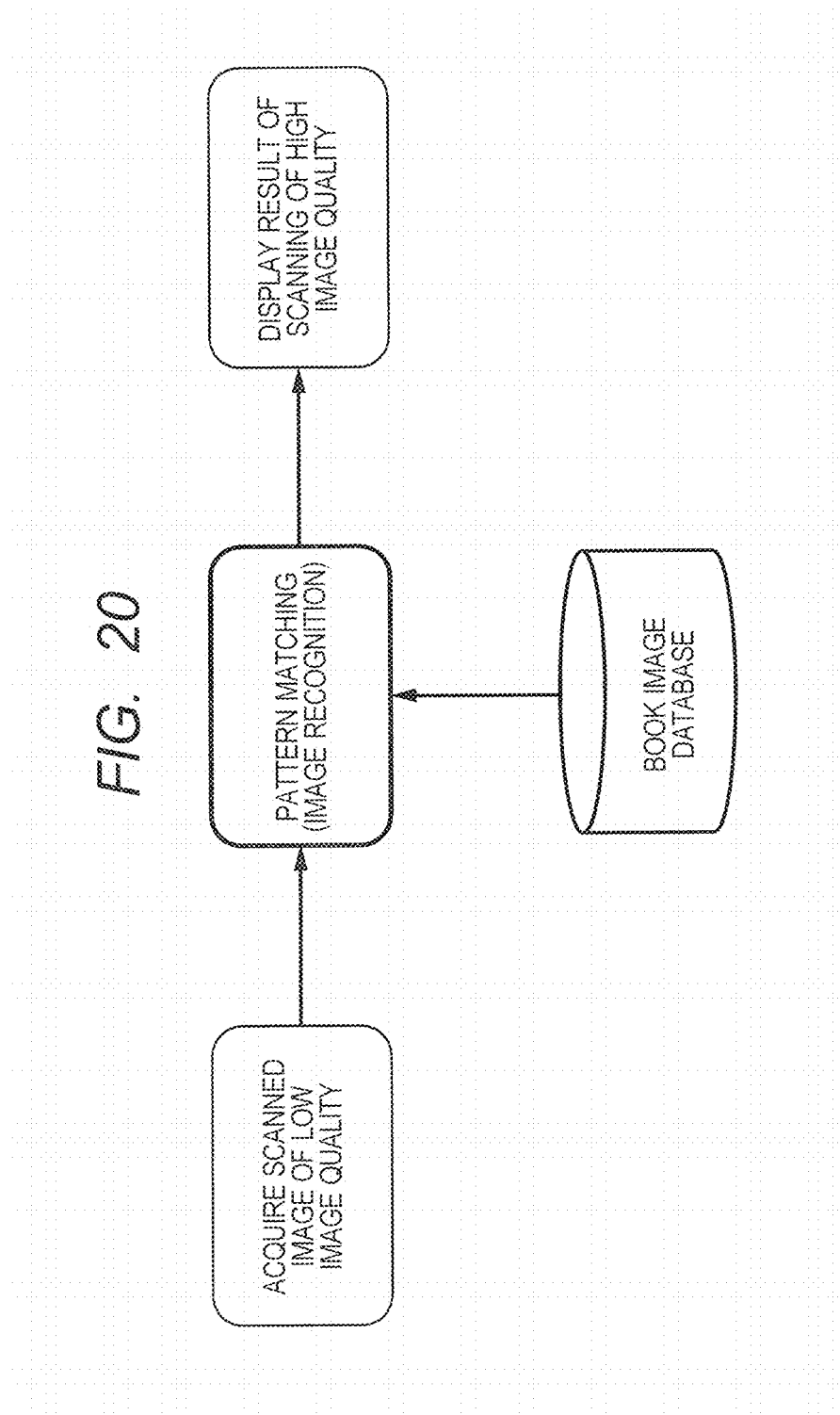
FIG. 20 is a diagram illustrating one example of roughly divided operations to be performed in each embodiment.

The operations performed in each embodiment of the present application are broadly divided into three operations of (1) a scanning operation, (2) a pattern matching operation and (3) a scanning result displaying operation as illustrated in FIG. 20. In the fifth embodiment, concrete processing details of (2) the pattern matching operation are proposed.

Since in each embodiment of the present application, the low-resolution image sensor 22 for mouse is used, it is feared that the pattern matching accuracy may be reduced mainly in regard to the following two points.

(i) The character string that the scanning result image indicates may be distorted due to a blur generated when the user traces the sentence concerned using the pen-shaped scanner 2 and a limit of accuracy in image synthesis.

(ii) The character string that the scanning result image indicates may become courser than the actual character string due to the low resolution of the pen-shaped scanner 2.

In the fifth embodiment, three pattern matching techniques are proposed in order to eliminate the above-mentioned disadvantages (i) and (ii). In the fifth embodiment, it becomes possible for the user to select a desirable pattern matching technique from the three pattern matching techniques.

Figure 21:
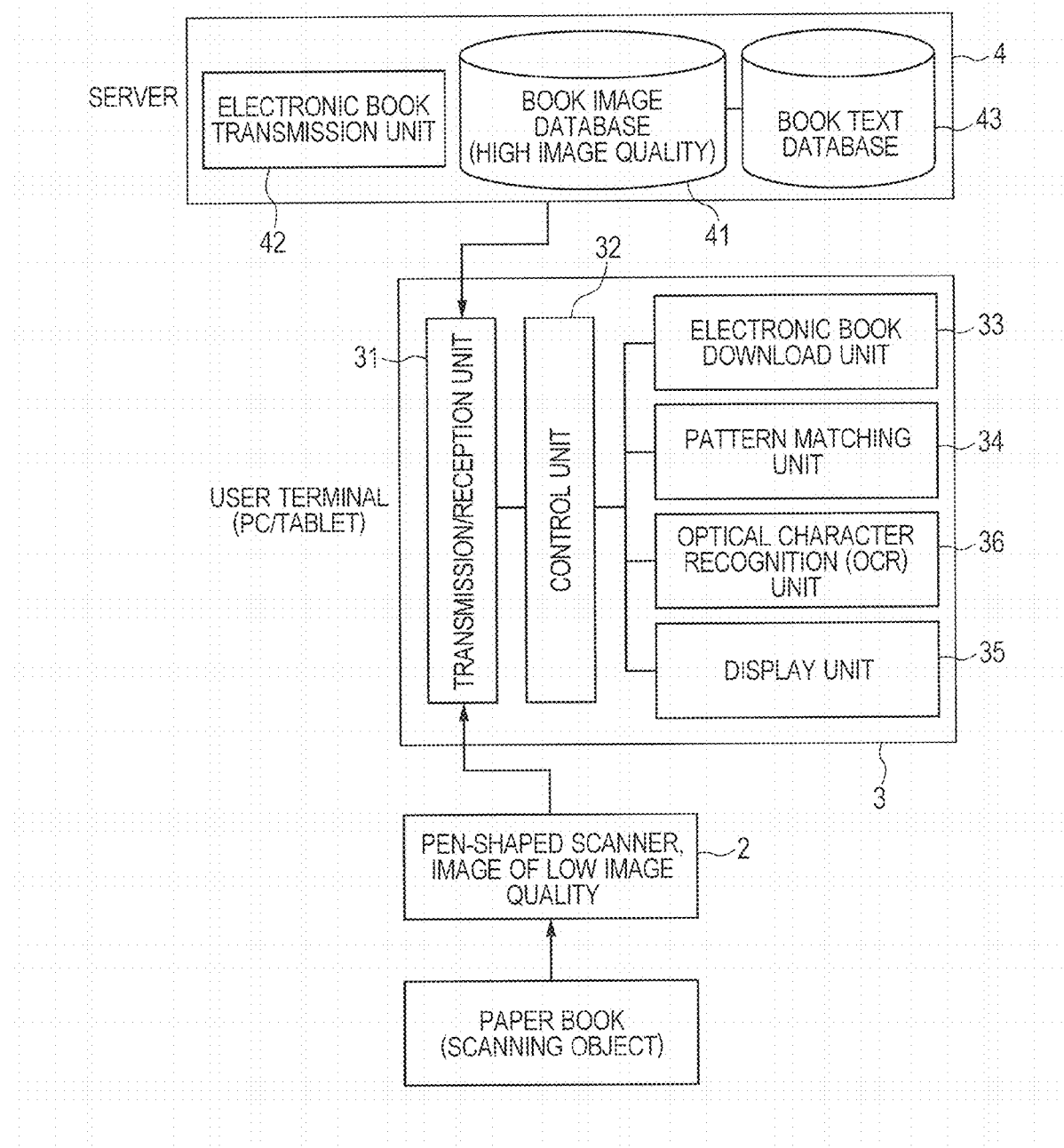
FIG. 21 is a configurational diagram illustrating one example of a user terminal and a server according to a fifth embodiment.

Then, one example of configurations of the user terminal 3 and the server 4 according to the fifth embodiment will be described with reference to FIG. 21. As illustrated in FIG. 21, the server 4 according to the fifth embodiment is different from the server 4 according to the fourth embodiment in the point that the server 4 according to the fifth embodiment further includes the book text database 43.

Since the book text database 43 is configured as already described with reference to FIG. 8 in the description of the second embodiment, description thereof is omitted.

First Pattern Matching Technique

Figure 22:
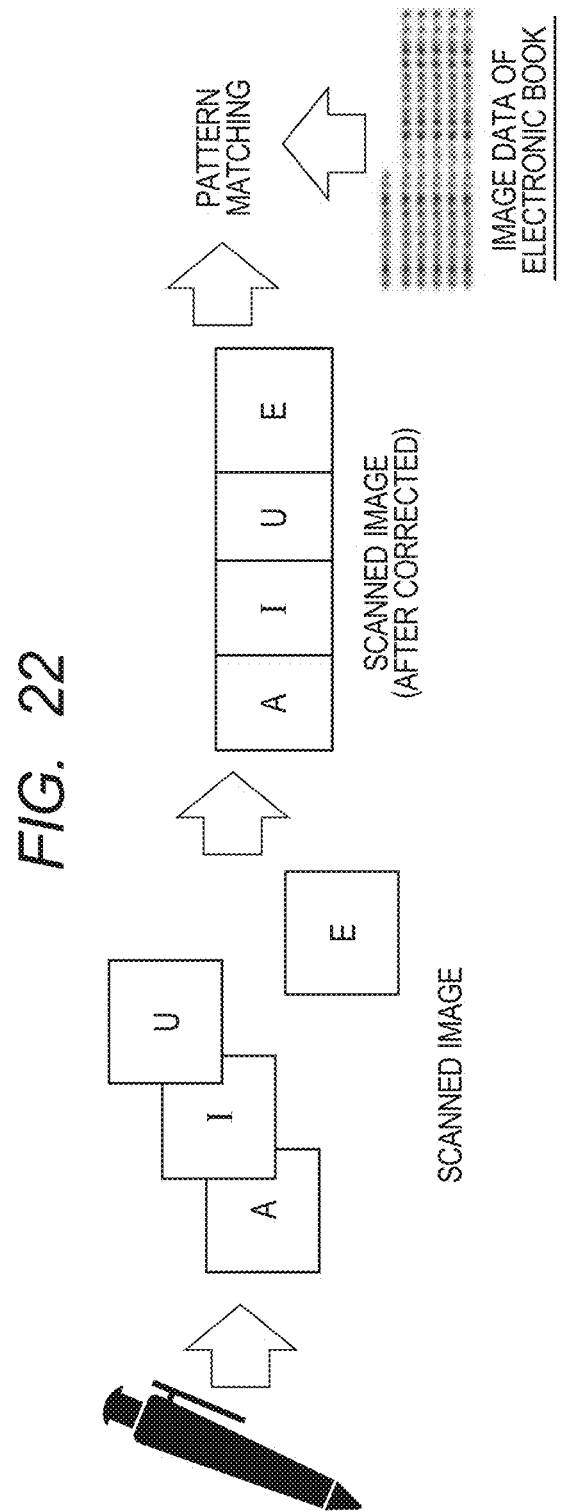
FIG. 22 is a diagram illustrating one example of a first pattern matching technique according to the fifth embodiment.

Then, the first pattern matching technique will be described with reference to FIG. 22. As illustrated in FIG. 22, in the first pattern matching technique, respective positions of images ("scanned images" in FIG. 22) that the plurality of pieces of character image data indicate are corrected from the position coordinates that pieces of the position coordinates data indicate such that the respective characters of the character string that the scanning result image data obtained by coupling together the plurality of pieces of character image data indicates are arrayed in a row or in a column by utilizing the points that the sentences in the book concerned are written horizontally or vertically and the user of the pen-shaped scanner 2 scans along the sentences.

For example, when the sentence concerned is written horizontally, the pattern matching unit 34 may correct the positions such that vertical central positions (for example, character gravity positions) of the respective characters are mutually aligned in a row, may correct the positions such that upper ends of the respective characters are mutually aligned in a row or may correct the positions such that lower ends of the respective characters are mutually aligned in a row.

For example, when the sentence concerned is written vertically, the pattern matching unit 34 may correct the positions such that horizontal central positions of the respective characters are mutually aligned in a column, may correct the positions such that left ends of the respective characters are mutually aligned in a column or may correct the positions such that right ends of the respective characters are mutually aligned in a column.

Incidentally, in deciding whether the sentence concerned is written horizontally or vertically, for example, when the position coordinate of each image that each piece of the character image data indicates is changed more largely in a horizontal direction than in a vertical direction, the pattern matching unit 34 decides that the sentence is written horizontally and when the position coordinate of each image that each piece of the character image data indicates is changed more largely in the vertical direction than in the horizontal direction, the pattern matching unit 34 decides that the sentence is written vertically on the basis of the position coordinate data included in each piece of the character image data.

It is possible to reduce the distortion of the character string that the scanning result image data obtained by coupling together the plurality of pieces of character image data indicates in the form of the image by correcting the positions of the images that the plurality of pieces of character image data indicate in this way.

Second Pattern Matching Technique

Figure 23:
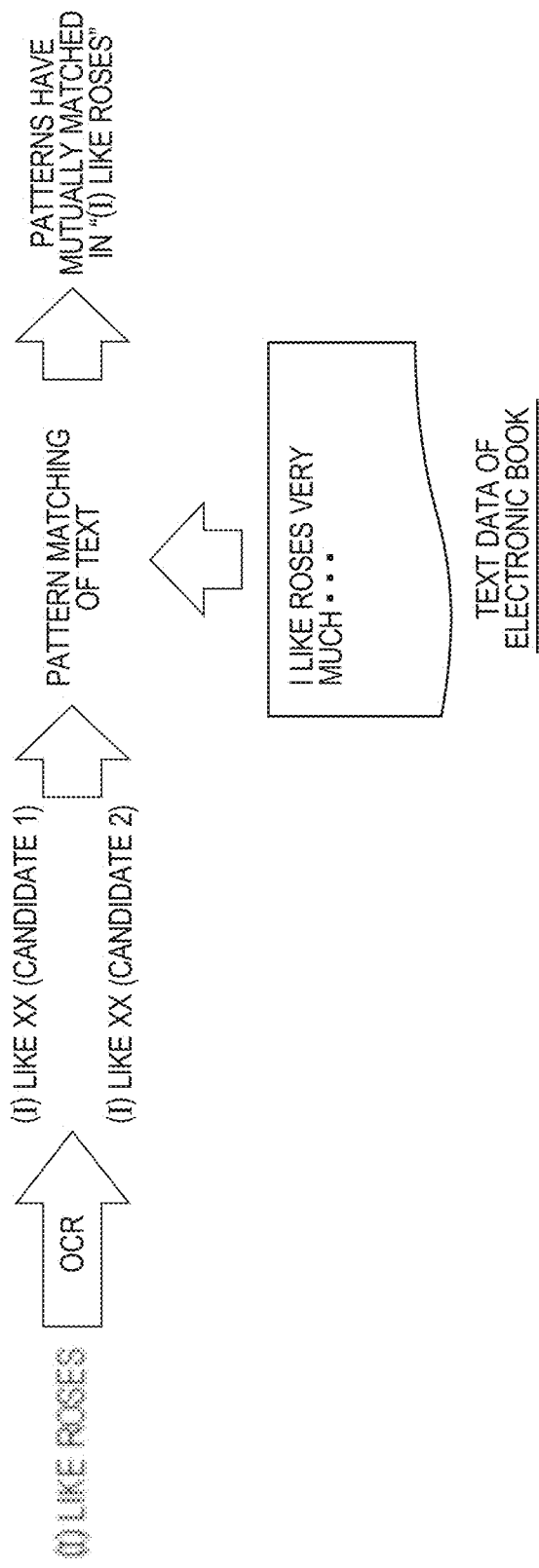
FIG. 23 is a diagram illustrating one example of a second pattern matching technique according to the fifth embodiment.

Then, the second pattern matching technique will be described with reference to FIG. 23. As illustrated in FIG. 23, in the second patter matching technique, the electronic book download unit 33 downloads the book text data from the server 4 in place of the book image data.

The pattern matching unit 34 performs OCR on the scanning result image data obtained by coupling together the plurality of pieces of character image data received from the pen-shaped scanner 2 and textizes only the character execution of OCR on which is possible in the plurality of characters included in the character string that the scanning result image data indicates in the form of the image.

The propriety of OCR is determined in accordance with whether there exists a candidate that exceeds a predetermined threshold value in identification rate value. Although, here, the identification rate indicates a degree of matching with a template of a character that is prepared in advance in execution of OCR, this technique that uses the identification rate is a general technique and therefore detailed description thereof is omitted.

Here, description will be made on the assumption that the threshold value is about 70%. For example, it is assumed that as a result of execution of OCR on the character "(a)", the identification rate on the basis of which the character concerned is decided to be the character "a" is about 75%, and the candidate "(o)" that is about 15% in identification rate and the candidate "(ne)" that is about 10% in identification rate have been obtained. In this case, since there exists the candidate "a" that is at least about 70% in identification rate, the pattern matching unit 34 decides that the candidate "a" is the character execution of OCR on which is possible and acquires the candidate "a" as a result of execution of OCR. On the other hand, for example, it is assumed that as a result of execution of OCR on the character "(kan)", the candidate "kan" that is about 45% in identification rate, the candidate "(mon)" that is about 35% in identification rate and the candidate "(kou)" that is about 20% in identification rate have been obtained. In this case, since all of the candidates are less than about 70% in identification rate, the pattern matching unit 34 decides that the character "kan" is the character execution of OCR on which is difficult.

The pattern matching unit 34 performs the pattern matching process on the text that the book text data that the electronic book download unit 33 has downloaded indicates and on the text obtained by textizing the character that has been decided that execution of OCR thereon is possible in the character string obtained by executing OCR on the scanning result image data. That is, partial match retrieval that the text obtained by textizing the character that has been decided that execution of OCR thereon is possible is used as a retrieval word is performed on the book text data.

The advantage of the second pattern matching technique lies in the point that the book image data in the book image database 41 stored in the server 4 becomes useless. That is, it is possible to implement the second pattern matching technique as long as there exists only the book text data in the book text database 43 stored in the server 4. However, since the pattern matching accuracy of the text depends on the number of characters execution of OCR on which is possible, it is preferable that the image sensor 22 of the pen-shaped scanner 2 have a certain resolution.

Third Pattern Matching Technique

Figure 24:
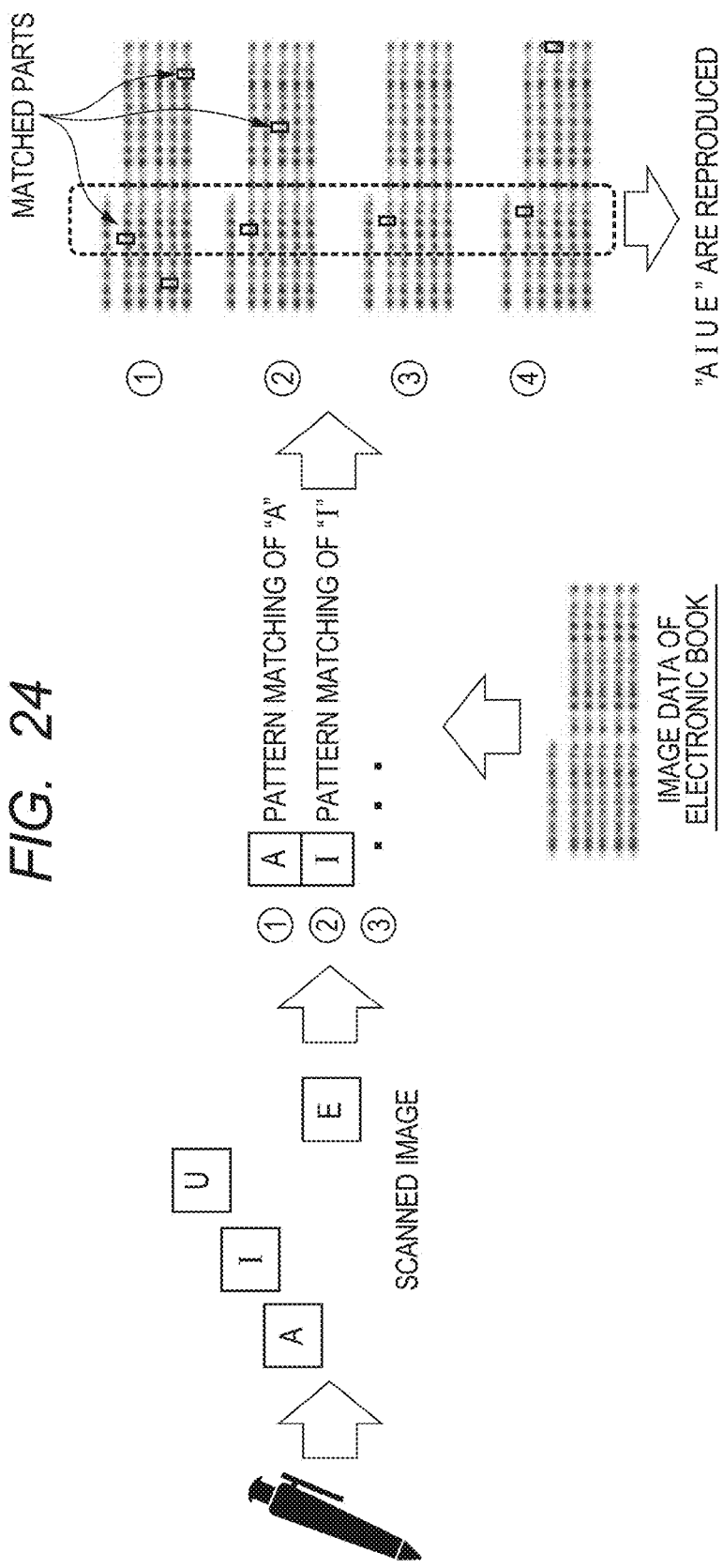
FIG. 24 is a diagram illustrating one example of a third pattern matching technique according to the fifth embodiment.

Then, the third pattern matching technique will be described with reference to FIG. 24. As illustrated in FIG. 24, in the third pattern matching technique, coupling of the plurality of pieces of character image data is not performed and the pattern matching process is performed for every image ("the scanned image" in FIG. 24) that each of the plurality of pieces of character image data indicates.

For simplicity of description, a case where it is possible for the pen-shaped scanner 2 to acquire the image of one character in one frame will be described with reference to FIG. 24. When it is difficult to acquire the image of one character in one frame, the pattern matching process is performed by using a part of each character that each image that has been acquired in each frame indicates.

The pattern matching unit 34 performs the pattern matching process on each of the plurality of images that the plurality of pieces of sentence image data that have been acquired from the pen-shaped scanner 2 indicate and on the image that the book image data that has been downloaded from the server 4 indicates in the order of time series on the basis of a scan time that scan time data included in the sentence image data indicates. On that occasion, the pattern matching unit 34 specifies a range that respective ranges of images that respectively match the images that the plurality of pieces of sentence image data indicate are arrayed in a line in one direction, in the order of time series, in the image that the book image data indicates.

The advantage of the third pattern matching technique lies in the point that since the plurality of pieces of character image data are not coupled together in this technique and therefore it is not requested to correct the positions of the images that the plurality of pieces of character image data indicate, the third pattern matching technique is effectively used when coupling of the pieces of the character image data is not successfully performed and hence the matching accuracy is reduced.

Figure 25:
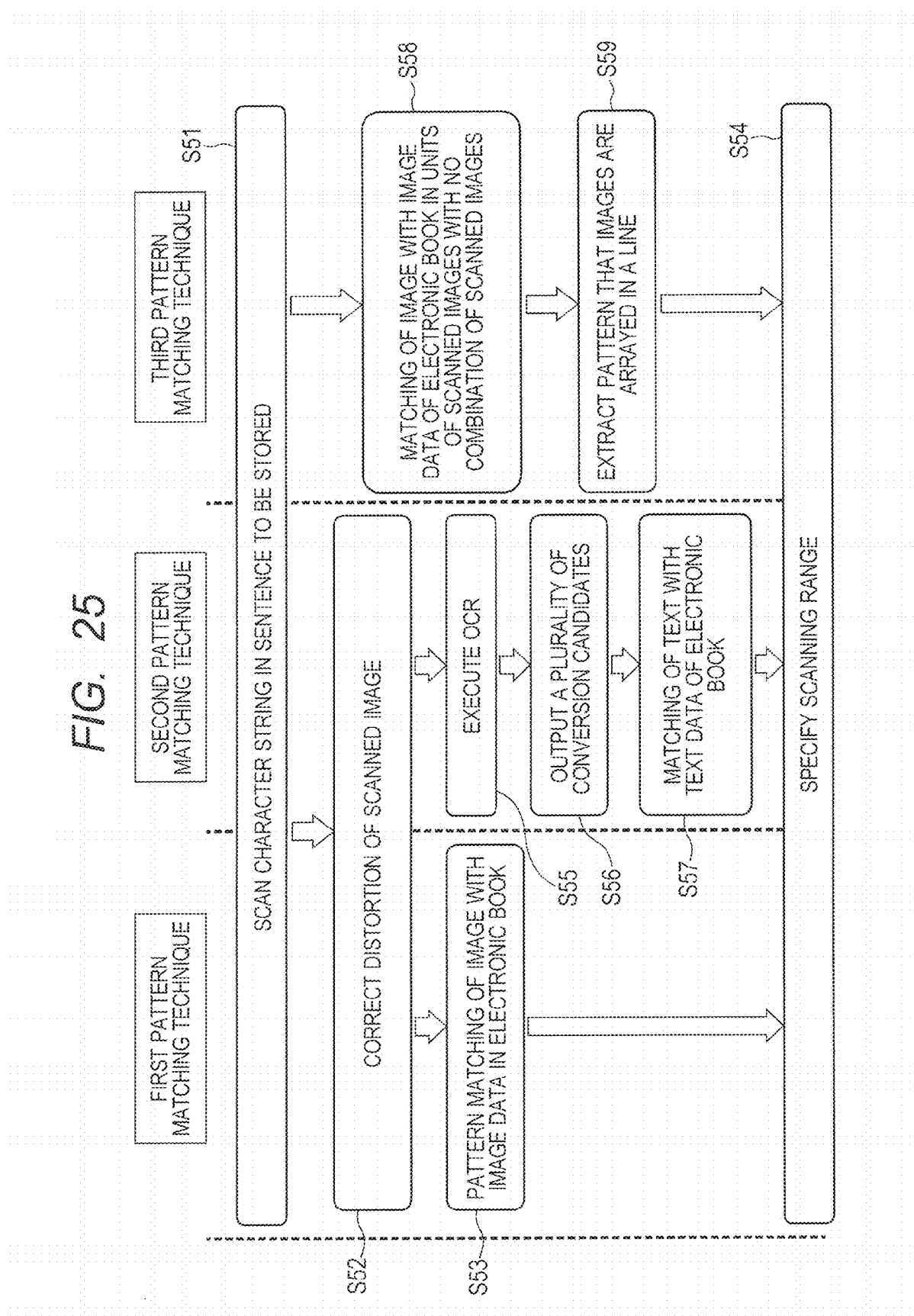
FIG. 25 is a flowchart illustrating one example of an operation of a scanning system according to the fifth embodiment.

Then, one example of the operation of the scanning system 1 according to the fifth embodiment will be described with reference to FIG. 25.

First, one example of the operation performed in the first pattern matching technique will be described. The user scans the optional character string (for example, one sentence) from within the sentences described in the paper book concerned by using the pen-shaped scanner 2 (S51). That is, the MCU 23 of the pen-shaped scanner 2 stores the plurality of pieces of character image data that are generated by the image sensor 22 while the switch 27 is being depressed into the memory 24. After termination of scanning of the character string, the transmitter/receiver 25 of the pen-shaped scanner 2 transmits the plurality of pieces of character image data stored in the memory 24 to the user terminal 3 as the scanned image data.

The pattern matching unit 34 of the user terminal 3 corrects the positions of the characters such that the respective characters in the plurality of images that the plurality of pieces of character image data transmitted from the pen-shaped scanner 2 indicate are arrayed in a line and couples together the plurality of pieces of character image data (S52). The pattern matching unit 34 performs the pattern matching process on the scanning result image data obtained by coupling together the plurality of pieces of character image data and on the book image data downloaded from the server 4 (S53). Thereby, the pattern matching unit 34 specifies the range that matches the image that the scanning result image data indicates as the range that the character string that matches the character string that has been scanned by using the pen-shaped scanner 2 is included from the image that the book image data indicates (S54). The data in the specified range is extracted as the above-mentioned partial image data.

Then, one example of the operation performed in the second pattern matching technique will be described. Incidentally, since step S51 and step S52 are as described above, description thereof is omitted. The optical character recognition unit 36 executes OCR on the scanning result image data (S55). The optical character recognition unit 36 generates the text data that indicates the text obtained by textizing only the character having the identification rate value that is at least the predetermined threshold value in the plurality of characters that configure the character string that the scanning result image data indicates and outputs the text data to the pattern matching unit 34 (S56). Here, when there exist the plurality of candidates having the identification rate values that are at least the threshold value at least for one character, the plurality of pieces of text data are generated for all combinations of the candidates and are output to the pattern matching unit 34.

The pattern matching unit 34 performs the pattern matching process on the text that the book text data downloaded from the server 4 indicates and on the text that the text data output from the optical character recognition unit 36 indicates (S57). Thereby, the pattern matching unit 34 specifies the ranges of the texts that match the text that has been acquired as the character execution of OCR on which is possible and of the text that corresponds to the character execution of OCR on which is difficult on the basis of a relation between the above-mentioned texts as the ranges that the character string that matches the character string that has been scanned by using the pen-shaped scanner 2 is included from the text that the book text data indicates (S54). The data included in the specified ranges is extracted as the above-mentioned partial text data.

Here, the range of the text that corresponds to the character execution of OCR on which is difficult on the basis of the relation between the texts is, for example, a range that N characters execution of OCR on which is not possible are included between two characters execution of OCR on which is possible (N is an optional positive integer), and in the book text data, also the range that indicates the N characters that are present between the two characters is specified as the range that matches the scanning result image data, in addition to the range that indicates two characters that respectively correspond to the characters execution of OCR on which is possible.

Then, one example of the operation performed in the third pattern matching technique will be described. Incidentally, since step S51 is as described above, description thereof is omitted. The pattern matching unit 34 of the user terminal 3 performs the pattern matching process on each of the plurality of images that the plurality of pieces of sentence image data transmitted from the pen-shaped scanner 2 indicate and on the image that the book image data downloaded from the server 4 indicates (S58). The pattern matching unit 34 extracts the range that the images that respectively match the plurality of images that the plurality of pieces of sentence image data indicate are arrayed in a line in the image that the book image data indicates (S59). Thereby, the pattern patching unit 34 specifies the extracted range as the range that the character string that corresponds to the character string scanned by using the pen-shaped scanner 2 is included (S54). The data in the specified range is extracted as the above-mentioned partial image data.

Then, one display example of a result of performing the pattern matching process according to the fifth embodiment will be described with reference to FIG. 26.

Figure 26:
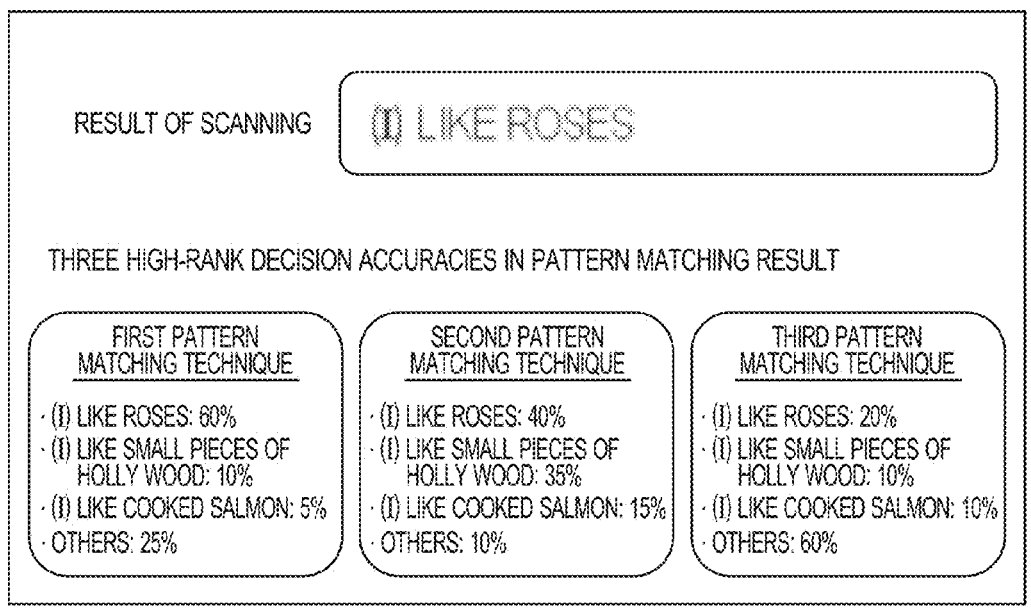
FIG. 26 is a diagram illustrating one display example of a pattern matching result according to the fifth embodiment.

As illustrated in FIG. 26, when the character string that has been obtained as the final result of scanning has been displayed and saved by any one of the first pattern matching technique to the third pattern matching technique, the display unit 35 displays the scanning result image, and a predetermined number of character strings as high-rank conversion candidates and the identification rates of these character strings obtained by each of the first pattern matching technique to the third pattern matching technique on the display. In FIG. 26, an example that the three character strings as the high-rank conversion candidates and the identification rates of these character strings are displayed is illustrated.

On this display screen, it is possible for the user to switch to the pattern matching technique to be utilized later on by selecting any one of the first pattern matching technique to the third pattern matching technique via the input unit of the user terminal 3. Since which pattern matching technique becomes high in accuracy is changed depending on the size of each character, complexity of each character, the number of characters and so forth of the sentence to be scanned, the scanning system 1 according to the fifth embodiment is configured such that it is possible for the user to perform switching among the first to third pattern switching techniques by operating the user terminal 3.

For example, in the first pattern matching technique, the degree of matching between the scanning result image that the scanning result image data obtained by coupling together the plurality of pieces of character image data indicates and each of the images in the range that the character string that has been set as the conversion candidate in the image that the book image data indicates is included is calculated as the identification rate by the pattern matching unit 34.

For example, in the second matching technique, the degree of matching between the text that has been obtained from the scanning result image data obtained by coupling together the plurality of pieces of character image data by executing OCR and each of the texts of the characters in the character string that has been set as the conversion candidate in the text that the book text data indicates is calculated as the identification rate by the pattern matching unit 34. Incidentally, in calculation of the identification rate, the text corresponding to the character execution of OCR on which is difficult may be excluded from a target for calculation of the matching degree.

For example, in the third matching technique, a value obtained by averaging the degrees of matching, each degree being obtained by matching each of the plurality of images that the plurality of pieces of sentence image data indicate and each of parts corresponding to the images in the range that the character string that has been set as the conversion candidate in the image that the book image data indicates is included, is calculated as the identification rate by the pattern matching unit 34 for each of the conversion candidates.

Incidentally, although in the above description, description has been made such that it is possible to select any of the first pattern matching technique to the third pattern matching technique, the present invention is not limited to the above-mentioned selection. For example, it may be embodied such that it is possible to select two optional techniques in the first pattern matching technique to the third pattern matching technique. In addition, it may be also embodied such that only one optional technique is performed in the first pattern matching technique to the third pattern matching technique.

In addition, although in the above description, the configuration that the first pattern matching technique to the third pattern matching technique have been applied to the fourth embodiment has been described as the fifth embodiment, the present invention is not limited to the above-mentioned configuration. For example, the first pattern matching technique to the third pattern matching technique may be applied to any of the first to third embodiments.

As described above, in the first pattern matching technique according to the fifth embodiment, the pen-shaped scanner 2 calculates the coordinate of the scanned position for each of the plurality of pieces of character image data on the basis of movement amount data (the data on the change amount of the coordinate position concerned) generated by the image sensor 22 in regard to the plurality of pieces of character mage data, and generates and transmits position coordinate data that indicates the calculated position coordinate. The pattern matching unit 34 corrects the positions of the respective characters included in the image that the scanning result image data indicates such that the characters are more linearly arrayed on the basis of the plurality of pieces of position coordinate data that the pen-shaped scanner 2 has transmitted.

Owing to the above-mentioned operation, since it is possible to reduce the distortion of the character string in the scanning result image, it is possible to improve the accuracy in pattern matching.

In addition, as described above, in the second pattern matching technique according to the fifth embodiment, the optical character recognition unit 36 executes OCR on the sentence image data that the pen-shaped scanner 2 has transmitted and generates the text data obtained by electronically textizing the character that is at least the predetermined threshold value in the identification rate in the character string of the image that the sentence image data indicates. The pattern matching unit 34 compares the book text data stored in the book text database 43 with the text data that the optical character recognition unit 36 has generated and extracts the partial text data that includes the range that has been decided to match the text data and the range that corresponds to the character that is not at least the predetermined threshold value in the identification rate from the book text data.

Owing to the above-mentioned operation, since the pattern matching process is performed by excluding the character that is low in recognition accuracy due to the distortion and so forth of the scanned image from consideration, it is possible to improve the accuracy in pattern matching.

In addition, as described above, in the third pattern matching technique according to the fifth embodiment, the pattern matching unit 34 operates so as to extract the range that the respective characters that the pieces of data decided to respectively match the plurality of pieces of character image data indicate are arrayed in a line in the order that the plurality of pieces of character image data have been generated from the book image data as the partial image data.

Owing to the above-mentioned operation, it is not requested to couple together the plurality of pieces of the character image data and to compare the image data so coupled with the book image data. Accordingly, since it is possible to avoid such a situation that coupling of the pieces of the character image data is not successfully performed and the pattern matching accuracy is reduced, it is possible to improve the pattern matching accuracy.

In addition, the program for the above-mentioned operations may be stored into various types of non-transitory computer readable media and then supplied to computers (the user terminal 3, the sever 4 and so forth). The non-transitory computer readable media include various types of tangible storage media. Examples of the non-transitory computer readable media include magnetic recording media (for example, a flexible disk, a magnetic tape, a hard disk drive and so forth), magneto-optical recording media (for example, a magneto-optical disk and so froth), a CD-ROM (Read Only Memory) CD-R, a CD-R/W, semiconductor memories (for example, a mask ROM, a PROM (Programmable ROM), an EPROM (Erasable PROM), a flash ROM, a RAM (Random Access Memory) and so forth). In addition, the program may be supplied to the computer concerned via various types of transitory computer readable media. Examples of the transitory computer readable media include electric signals, optical signals, electromagnetic waves and so forth. It is possible for the transitory computer readable storage medium to supply the program to the computer concerned via a cable communication path such as, for example, an electric wire, an optical fiber and so forth, or a radio communication path.

Although in the foregoing, the invention that has been made by the inventors and others has been specifically described on the basis of the preferred embodiments of the present invention, it goes without saying that the present invention is not limited to the above-mentioned embodiments and may be altered and modified in a variety of ways within the range not deviating from the gist of the present invention.

Although in the above mentioned embodiments, the case where the scanning object is the sentence described in the paper book has been described, the scanning object is not limited to the sentence. For example, the scanning object may be a picture. That is, it is possible to utilize the present invention when a specific part of the picture concerned is to be stored by closing the specific part up. In this case, image data indicating images of the picture may be retained in the server 4.

Although in the above-mentioned embodiments, the example that the server 4 includes the book image database 41 and the book text database 43 and the user terminal 3 performs pattern matching, optical character recognition, and display and saving of the final scanning result has been described, the present invention is not limited to this example. The present invention may be embodied such that the above-mentioned elements are included in a single information processing device (for example, a PC, a tablet, the server 4 and so forth). For example, the server 4 may include the respective units 31 to 35, and 41 to 43 in the above-mentioned embodiments and the pen-shaped scanner 2 may transmit the image data generated by scanning directly to the server 4.

Although in the above-mentioned third and fourth embodiments, the example that the range for pattern matching is narrowed down to the book image data of one page of the electronic book concerned has been described, range narrowing is not limited to the above. For example, when the user has performed an inputting operation for designating the line number from the input unit of the user terminal 3, the pattern matching unit 34 may further narrow the range for pattern matching down to the line number designated by the inputting operation.

Parts or all of the above-mentioned first to fifth embodiments may be also described as in the following appendix.

Appendix 1

A program that makes a computer execute the processes of receiving sentence image data from a pen-shaped scanner that scans a character string that is one part of a sentence described in a paper book and generates and transmits the sentence image data on the basis of the scanned character string, acquiring book image data from a storage unit that the book image data that is higher in image quality than the sentence image data and is obtained by electronically imaging the sentence described in the paper book is stored, and comparing the book image data with the sentence image data that the pen-shaped scanner has transmitted and extracting partial image data that has been decided to match the sentence image data from the book image data.

What is claimed is:

1. A scanning system comprising:
a pen-shaped scanner that scans a character string that is one part of a sentence described in a paper book and generates and transmits sentence image data on the basis of the scanned character string;
a storage unit that book image data that is higher in image quality than the sentence image data and is obtained by electronically imaging the sentence described in the paper book is stored, and
a matching unit that compares the book image data with the sentence image data that the pen-shaped scanner has transmitted and extracts partial image data that has been decided to match the sentence image data from the book image data.

2. The scanning system according to claim 1,
wherein the pen-shaped scanner includes a first switch adapted to be depressed when a user scans the character string that is one part of the sentence described in the paper book and generates image data obtained by electronically imaging the character string that has been scanned while the first switch is being depressed as the sentence image data.

3. The scanning system according to claim 1,
wherein the storage unit further stores therein book text data obtained by electronically textizing the sentence described in the paper book, and
wherein the matching unit extracts partial text data that corresponds to the partial image data that has been decided to match the sentence image data in the book image data from the book text data.

4. The scanning system according to claim 2,
wherein the storage unit stores therein a plurality of pieces of the book image data that respectively correspond to respective pages of a plurality of the paper books,
wherein the pen-shaped scanner includes a second switch adapted to be depressed when the user scans a character string of an ISBN number described in the paper book and generates and transmits ISBN number image data obtained by electronically imaging the character string of the ISBN number that has been scanned while the second switch is being depressed,
wherein the scanning system further comprises:
an optical character recognition unit that performs OCR (Optical Character Recognition) on the ISBN number image data that has been transmitted from the pen-shaped scanner and generates first text data obtained by electronically textizing the character string of the ISBN number; and
a selection unit that selects one piece of the book image data corresponding to the paper book having the ISBN number that the first text data indicates in the pieces of book image data, and
wherein the matching unit compares the book image data that the selection unit has selected with the sentence image data.

5. The scanning system according to claim 4,
wherein the second switch is adapted to be depressed when the user scans a character string of a page number described on a page along which the character string that is one part of the sentence is scanned,
wherein the pen-shaped scanner further generates and transmits page number image data obtained by electronically imaging the character string of the page number that has been scanned while the second switch is being depressed,
wherein the optical character recognition unit further performs OCR on the page number image data that has been transmitted from the pen-shaped scanner and generates second text data obtained by electronically textizing the character string of the page number, and
wherein the selection unit further selects the book image data corresponding to the page number that the second text data indicates from the book image data corresponding to the paper book having the ISBN number.

6. The scanning system according to claim 5,
wherein the pen-shaped scanner further includes
a third switch adapted to be depressed when the user moves the pen-shaped scanner from a position that the page number is denoted to a position that the character string that is one part of the sentence is scanned in one page of the paper book, and
an image sensor that scans the character string a plurality of times at different positions at a predetermined time interval when the user has traced the character string by the pen-shaped scanner and generates a plurality of pieces of character image data obtained by electronically imaging one part of the character string at the different positions as the sentence image data, and generates moving amount data indicating a moving amount of the pen-shaped scanner on the basis of the temporally adjacent pieces of character image data, and
calculates a position coordinate of the pen-shaped scanner obtained when depression of the third switch has been stopped on the basis of the moving amount indicated by the moving amount data that is generated by the image sensor while the third switch is being depressed, with the position coordinate of the pen-shaped scanner obtained when the third switch has been depressed being set as a reference and transmits position coordinate data indicating the calculated position coordinate, and
wherein the matching unit specifies a position that the pen-shaped scanner has started scanning of the character string that is one part of the sentence in the book image data that the selection unit has selected on the basis of the position coordinate of the pen-shaped scanner that the position coordinate data that has been transmitted from the pen-shaped scanner indicates and compares a predetermined range defined with the specified position being set as a reference with the sentence image data.

7. The scanning system according to claim 1,
wherein the pen-shaped scanner includes an image sensor that scans the character string a plurality of times at different positions at a predetermined time interval when the user has traced the character string by the pen-shaped scanner and generates a plurality of pieces of character image data obtained by electronically imaging one part of the character string at the different positions as the sentence image data, and
wherein the matching unit generates scanning result image data obtained by coupling together the pieces of the character image data so as to mutually superimpose overlapped parts of a plurality of images that the pieces of the character image data indicate as the sentence image data to be compared with the book image data.

8. The scanning system according to claim 7,
wherein the image sensor generates moving amount data indicating a moving amount of the pen-shaped scanner on the basis of pieces of temporally adjacent character image data, wherein the pen-shaped scanner calculates the scanned position coordinate for each of the pieces of character image data on the basis of the moving amount data to be generated regarding the pieces of character image data, and generates and transmits position coordinate data indicating the calculated position coordinate, and wherein the matching unit corrects positions of the respective characters included in an image that the scanning result image data indicates such that the respective characters are arrayed more linearly on the basis of the pieces of position coordinate data that the pen-shaped scanner has transmitted.

9. The scanning system according to claim 1, wherein the storage unit further stores therein book text data obtained by electronically textizing the sentence described in the paper book, wherein the scanning system further comprises an optical character recognition unit that performs OCR (Optical Character Recognition) on the sentence image data that the pen-shaped scanner has transmitted and generates text data obtained by electronically textizing a character that is at least a predetermined threshold value in identification rate value in the character string of an image that the sentence image data indicates, wherein the matching unit is switchable to an operation of comparing the book image data with the sentence image data and extracting the partial image data that has been decided to match the sentence image data from the book image data and to an operation of comparing the book text data with text data that the optical character recognition unit has generated and extracting partial text data that includes a range that has been decided to match the text data and a range corresponding to a character that is not at least the predetermined threshold value in identification rate value from the book text data.

10. The scanning system according to claim 1, wherein the pen-shaped scanner includes an image sensor that scans the character string a plurality of times at different positions at a predetermined time interval when a user has traced the character string by the pen-shaped scanner and generates a plurality of pieces of character image data obtained by electronically imaging one part of the character string at the different positions as the sentence image data, and wherein the matching unit extracts a range that respective characters that data that has decided to match the respective pieces of character image data indicates are arranged in a line in order that the pieces of character image data have been generated from the book image data as the partial image data.

11. The scanning system according to claim 1, further comprising:

a server that includes the storage unit, and a terminal device that includes the matching unit.

12. A terminal device comprising:

a reception unit that receives sentence image data from a pen-shaped scanner that scans a character strings that is one part of a sentence described in a paper book and generates and transmits the sentence image data on the basis of the scanned character string;

a storage unit that stores therein book image data that is higher in image quality than the sentence image data and obtained by electronically imaging the sentence described in the paper book, and a matching unit that compares the book image data with the sentence image data that the pen-shaped scanner has transmitted and extracts partial image data that has been decided to match the sentence image data from the book image data.

13. A scanning method comprising the steps of:

receiving sentence image data from a pen-shaped scanner that scans a character string that is one part of a sentence described in a paper book and generates and transmits the sentence image data on the basis of the scanned character string;

acquiring book image data from a storage unit that stores therein the book image data that is higher in image quality than the sentence image data and is obtained by electronically imaging the sentence described in the paper book, and comparing the book image data with the sentence image data that the pen-shaped scanner has transmitted and extracting partial image data that has been decided to match the sentence image data from the book image data.

\* \* \* \* \*